United States Patent
Tompkins

(10) Patent No.: US 10,353,882 B2
(45) Date of Patent: Jul. 16, 2019

(54) PACKAGING DATA SCIENCE OPERATIONS

(71) Applicant: Adobe Inc., San Jose, CA (US)

(72) Inventor: David Tompkins, Menlo Park, CA (US)

(73) Assignee: ADOBE INC., San Jose, CA (US)

( * ) Notice: Subject to any disclaimer, the term of this patent is extended or adjusted under 35 U.S.C. 154(b) by 393 days.

(21) Appl. No.: 15/197,800

(22) Filed: Jun. 30, 2016

(65) Prior Publication Data
US 2018/0004784 A1    Jan. 4, 2018

(51) Int. Cl.
*G06F 16/22* (2019.01)
*G06F 16/2457* (2019.01)

(52) U.S. Cl.
CPC .......... *G06F 16/22* (2019.01); *G06F 16/2457* (2019.01)

(58) Field of Classification Search
None
See application file for complete search history.

(56) References Cited

U.S. PATENT DOCUMENTS

| | | | |
|---|---|---|---|
| 5,920,873 A * | 7/1999 | Van Huben | G06Q 10/04 |
| 2006/0101224 A1 * | 5/2006 | Shah | G06F 9/5077 |
| | | | 711/173 |
| 2007/0143302 A1 | 6/2007 | Stone | |
| 2011/0131546 A1 | 6/2011 | Elaasar | |
| 2012/0078968 A1 | 3/2012 | Nixon | |
| 2014/0359604 A1 * | 12/2014 | Salameh | G06F 8/60 |
| | | | 717/177 |
| 2016/0232457 A1 * | 8/2016 | Gray | G06T 11/206 |
| 2017/0017903 A1 * | 1/2017 | Gray | G06N 99/005 |
| 2017/0053357 A1 | 2/2017 | Bowman et al. | |
| 2018/0004363 A1 | 1/2018 | Tompkins | |
| 2019/0042068 A1 | 2/2019 | Tompkins | |

OTHER PUBLICATIONS

U.S. Appl. No. 15/197,793, filed Apr. 6, 2018, Preinterview 1st OA.
U.S. Appl. No. 15/197,793, Jul. 11, 2018, Notice of Allowance.

* cited by examiner

*Primary Examiner* — Uyen T Le
(74) *Attorney, Agent, or Firm* — Keller Jolley Preece

(57) ABSTRACT

The present disclosure relates to a data science system that packages data science operations. The data science system packages a data science operation with a component descriptor or service descriptor to allow the data science system to easily apply and execute the data science operations using data from a variety sources. As described herein, the data science system also enables a user to provide data science packages to a marketplace as well as retrieve data science packages created by other users from the marketplace. Further, the data science system can customize a data science package obtained from the marketplace to perform data science operations using data belonging to the user or using user-specified parameters.

20 Claims, 14 Drawing Sheets

Fig. 2B

Data Platform    Designer    Data Sources    Marketplace                                              Joe Blake Data Sources 212                              Actions 214                          Test and Deploy 216

🔍 Find a data source...                      🔍 Find an action...                  ⬆ Load   ☁ Save   ⚙ Deploy as Service   ▲ Run   ⬛ Stop ⌄ Clicks ⎬218                                 ⌄ Frequency Distribution Table ⎬220   Selected Data
> G2NAComplaint                                 > Data Validation Filter ⎱
> Link Hovers                                   > Data Categorization    ⎬550
> MDPComplaint                                  > Data Analysis          ⎰       Code                              + Save Code as Action  ⬛
> Attribution Dataset                         > Attribution Analysis               1  // selected data sources will be loaded into a spark DataFrame and
> Sales Dataset                               > Campaign Caps                         injected as variable dataFrame.
> 10Q Survey Dataset                          > Day of Week Spend                   2  // assign computation results to val result for graph support
> 20Q Survey Dataset                          > Delayed Revenue                     3
> Customer Satisfaction Questions             > Geo Analysis (USA)                  4
> Focus Group Dataset                         > Mobile Optimization
> Social Network Dataset                      > Normalized SIM (Combined)
                                              > Portfolio Anomaly Detection
                                              > Portfolio Pre/Post                 Output                          A Text View   ▌▌▌ Graph View   ⬛
                                              > Quality Score
                                              > Query Cross Matching
                                              > Search Engine Spend
                                              > Segment Demographics
                                              > Settings Audit
                                              > Time-of-Day Analysis

*Fig. 5*

PACKAGING DATA SCIENCE OPERATIONS

BACKGROUND

Data science, in general terms, is the extraction of information from large volumes of unstructured data, called data sets. Because of the complexities and large amounts of data involved in data science operations, experts, such as trained data scientists, are typically needed to perform operations on these massive data sets. Further, trained data scientists commonly require sophisticated computing processes, hardware, and software to perform data science operations. Even with the proper tools and instruments, data scientists still face numerous challenges when working with large data sets and preforming data science operations.

To illustrate, to work with a large data set, a data scientist must first provision a dedicated storage space for the data set. Even with recent advancements in computer storage, finding dedicated storage space for large data sets can be difficult. Next, the data scientist must manually clean the data, which can involve editing the formatting and structure of thousands of lines of data to ensure proper readability of the data set. Then, upon cleaning the data set, the data scientist can run algorithms on the data. Before running a data science algorithm, however, the data scientist often needs to manually program (i.e., code) the algorithm, which requires the data scientist to be knowledgeable in computer programming.

The advent of general-purpose frameworks for large-scale data science computations has improved data science by standardizing and simplifying the above described process of handling large data sets. Nevertheless, data scientists using complicated processes are still needed in order to operate on data and implement algorithms. Further, while many data science techniques include elements that are becoming more standardized (e.g. data cleaning and/or normalization), these general-purpose frameworks remain too complex to enable many users, including data scientists to successfully use these frameworks.

As such, in the field of data science, there remains a need for an improved framework to perform data science operations. In particular, current data science techniques require large computing power and timeframes and are otherwise inefficient and inflexible. These and other problems exist with regard to current and traditional data science techniques.

BRIEF SUMMARY

Embodiments of the present disclosure include systems and methods that provide a data science package that makes data science operations easier to transfer, process, and execute. In particular, the disclosed systems and methods generate a component descriptor that serves as a lightweight container for the data science package. The component descriptor provides a description of the data science operation within the data science package, including the data types needed to perform the data science operation. In addition, the component descriptor provides executable information that binds user-specified data and values to a data science algorithm as part of the process of creating a customized data science operation.

In embodiment in which the data science package includes multiple data science algorithms, the systems and methods generate a component descriptor for each data science algorithm. In addition, the disclosed systems and methods generate a service descriptor that describes the data science operation as a whole, including functions of the data science operation, how the data science algorithms interact with each other, and data types for performing the data science operation. The data science system disclosed herein provides an intelligent packaging process that enables data science systems to share data science packages among each other. The data science packages enable the data science system to quickly execute data science algorithms, regardless of the author with a user's data in a simple and effective manner.

Additional features and advantages of one or more embodiments of the present disclosure are set forth in the description which follows, and in part will be obvious from the description, or may be learned by the practice of such example embodiments.

BRIEF DESCRIPTION OF THE DRAWINGS

The disclosure describes one or more embodiments with additional specificity and detail through the use of the accompanying drawings, in which:

FIGS. 2A-2D illustrate example graphical user interfaces of the data science system that enables a user to create and perform a data science operation in accordance with one or more embodiments;

FIG. 5 illustrates an example graphical interface of generating a service component in accordance with one or more embodiments;

DETAILED DESCRIPTION

Figure 1:
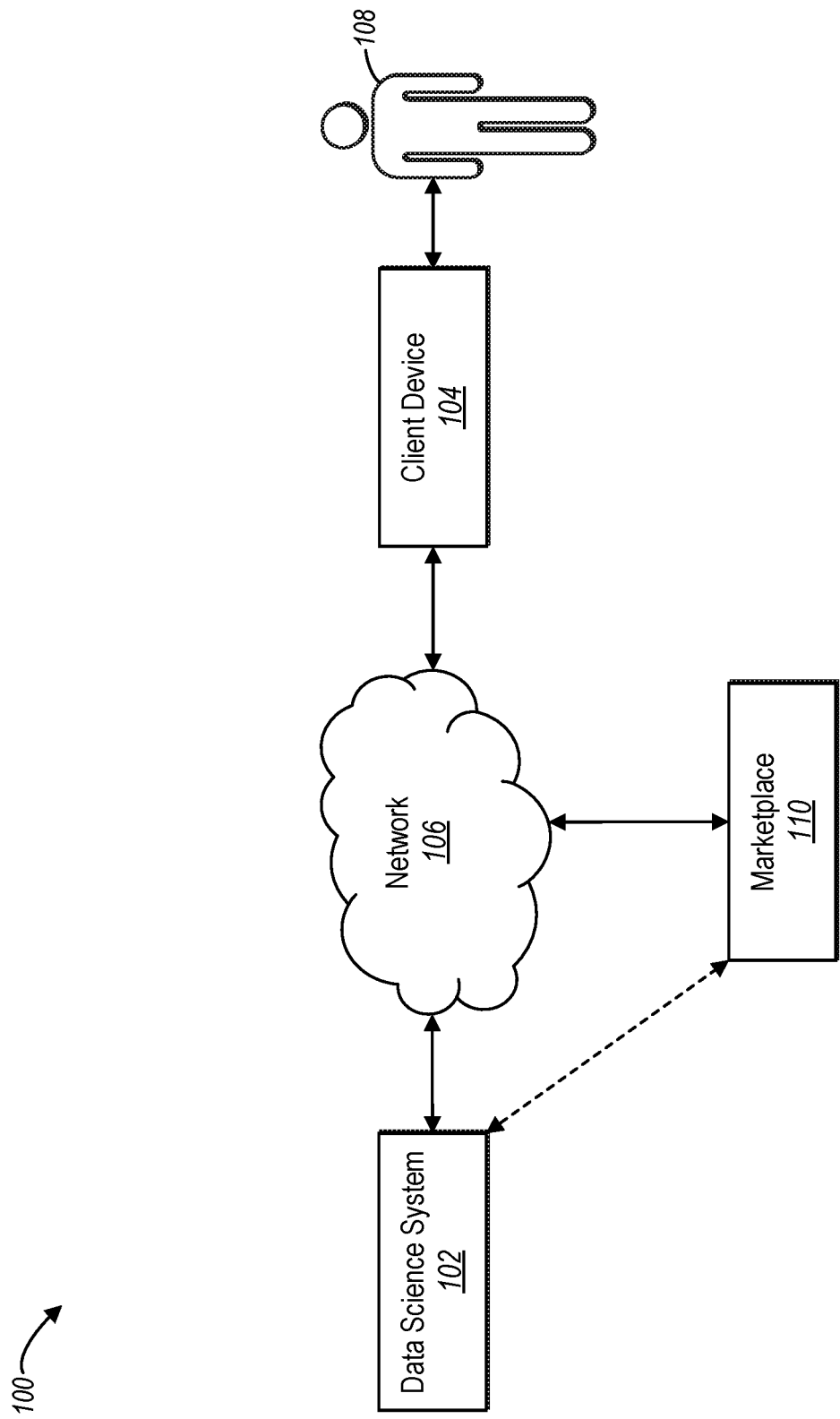
FIG. 1 illustrates a schematic diagram of an example environment in which the data science system operates in accordance with one or more embodiments.

One or more embodiments of the present disclosure include a data science system that improves perform data science operations by facilitating the creation and operation, and execution of data science operations using data science packages. As such, the data science system disclosed herein enables users, such as untrained and trained data scientists alike, to more easily create and perform one or more data science operations. In particular, the data science system disclosed herein provides an intelligent packaging process that enables data science packages to be transferred among users as well as shared to a data science marketplace. Likewise, the data science system is configured to easily and conveniently execute data science operations by loading a user's data into a data science package created by another user. For example, the data science system uses a descriptor from a data science package to identify inputs and parameters needed to execute the package, thereby enabling the data science system to pair the data science package with appropriate data sources belonging to the user. Thus, as one advantage, using data science packages enables the data science system to assist a user in easily obtaining data science results without requiring the user to build algorithms from scratch for their own data.

As mentioned above, the term "data science" generally refers to extraction of information from large volumes of unstructured data. Data science can also include extracting information from structured data as well. The term "data science operation" generally refers to analyzing large amounts of raw or structured data according to one or more data science algorithms to achieve a result, which provides knowledge and insights from the analyzed data. A "data science algorithm" is a set of steps that, when followed, solve a data science question or complete a data science process. In general, a data science algorithm receives the raw (i.e., unstructured) data from a data source as input and outputs processed data in the form of a result.

As an initial overview of the disclosed technology, a data science package includes a data science operation. A data science operation, which is described further below, includes referenced data from a particular user's data source and a data science algorithm. In addition to the data science operation, a data science package often includes algorithm code and/or visualization code used to execute the data science operation. As used herein, the term "referenced data" generally refers to data referenced by the data science system based on a user's selection of data from within a data source. For simplicity, the terms referenced data and selected data are used interchangeably.

In one or more embodiments, a data science package also includes at least one component descriptor. The term "component descriptor," as used herein refers generally to a container that describes a data science operation within a data science package. For example, a component descriptor generally describes the contents of a data science package. In addition, a component descriptor includes the data types needed to perform a data science algorithm with a data science operation. Further, the component descriptor provides executable information that binds user-specified data and values to a data science algorithm as part of the process of creating a customized data science operation.

In general, a component descriptor enables the data science system to apply data from any compatible data source to the data science algorithm within the packaged data science operation. In this manner, the component descriptor enables the data science system to create a customized data science operation based on user-specified (compatible) data. More specifically, the component descriptor serves as a lightweight execution container for the data science package that provides information about the packaged data science operation, including a brief description of the data science operation, functions of the data science algorithm, and data types that are required to perform the data science operation.

In a number of embodiments disclosed herein, the data science system generates a component descriptor upon creating or packaging a data science operation. To create a component descriptor, the data science system analyzes the data science operation to identify required and optional parameters. The terms "required parameter" and "optional parameter," as used herein, generally refer to a data element used within a data science algorithm or data science operation. In general, parameters correspond to inputs and outputs of a data science algorithm. For example, a required parameter is mandatory for a data science algorithm to function. An optional parameter enhances the functionality of the data science algorithm, such as causing the output results of a data science operation to be more precise or causing the output results to include additional information.

In addition, the data science system reviews the referenced data in connection with the data science algorithm to determine which data types are needed for the data science operation. The data science system then creates a component descriptor that indicates the identified parameters and the necessary data types. Further, the data science system includes general information about the data science operation within the component descriptor. The data science system then adds the component descriptor to a data science package, as mentioned above.

In some embodiments, a data science operation includes multiple data science algorithms. When this occurs, the data science system creates multiple component descriptors. Further, to prevent conflicts between the multiple component descriptors, the data science system generates a service descriptor that specifies how the multiple data science algorithms cooperate with each other within the data science operation. Generally speaking, a service descriptor is similar to a component descriptor in that a service descriptor provides a brief description about a data science operation as well as indicate parameters and data types used in the data science operation. Accordingly, the term "service descriptor," as used herein generally refers to a container that describes a data science operation that includes multiple data science algorithms and/or component descriptors within a data science package.

As mentioned above, descriptors (e.g., component and service descriptors) provide information about a corresponding data science package. In addition, the data science system uses the information in a descriptor to run data science operations for various users. For example, upon retrieving a data science package for a particular user, the data science system analyzes the descriptor to identify required data types. The data science system then binds referenced data belonging to a particular user to a data science algorithm within the data science package to obtain results from the data.

In one or more embodiments, the data science system uses a descriptor (e.g., component and service descriptors) when registering a data science package with a data science marketplace (or simply marketplace). In general, a marketplace is a repository of data science packages where users purchase, download, and/or access data science packages. Because the descriptor in a data science package includes information about the data science operation, parameters, and data types, the data science system uses the descriptor to register and add a data science package to the marketplace. In this manner, the marketplace provides information about a data science package to visiting users from the descriptor and without needing to unpack the data science package.

The data science system provides a number of benefits over traditional data science systems. As one example, the data science system enables users of all skill levels to seamlessly apply their data to a packaged data science operation to obtain results. Further, a descriptor (e.g., component descriptor or service descriptor) in each data science package provides a lightweight execution container that enables the data science system, a marketplace, or another system to easily interface with the data science package.

Additionally, the data science system provides recommendations to a user based on a descriptor from a data science package. As mentioned above, the data science system uses the descriptor to identify parameters and data types used in a corresponding data science operation. Using this information, the data science system matches the parameters and data types from the data science package to data from a user's data sources to identify compatible data sources. The data science system filters and displays the compatible data sources to a user, creating a simplified and streamlined experience for the user.

Moreover, employing a descriptor to package a data science package improves the function and performance of a computing device or computer system reading and executing the data science package. For example, the data science system creates a new data structure that uses a container (e.g., a component descriptor or service descriptor) to wrap the components within the package. As such, when a computing device accesses the data science package, the computing device need only parse and process the descriptor without needing to unpack, parse, and execute the entire contents of the data science package. Parsing and processing less data allows a computing device to more quickly search for and process data. Further, because the data science system does not need to unpack an entire data science package to identify the package's contents, a computing device requires less memory to access the data science package.

In addition, using data science packages provides increased flexibility to a computing device or a computing system. For example, a computing device can quickly parse and load a data science package, rather than needing to read and compile lengthy computer code, which requires additional memory capacity and increased processing. Further, using data science packages enables a computing device to quickly perform on-the-fly processing of data science algorithms, and in turn, data science operations.

As another benefit, the data science system only requires a minimal operating system to start a data science operation and monitor its execution. For example, conventional data science systems require a complex interworking of devices to process large amounts of data science data. However, because the data science system of the present disclosure simplifies the process of creating and performing data science algorithms and data science operations by using data science packages with descriptors, only a minimal operating system is needed to execute data science operations, even when processing large amounts of data.

Additional features and characteristics of one or more embodiments of a data science system are described below with respect to the figures. For example, FIG. 1 illustrates an environment 100 in which the data science system 102 operates. The environment 100 includes the data science system 102 communicating with a client device 104 via a network 106. The data science system 102 can operate on one or more computing devices, such as one or more server devices. Additional components and features of the environment 100 are described in connection with FIG. 11.

The environment 100 also includes a user 108. The user 108 may be a novice user (e.g., a layperson) who is not a trained data scientist or computer programmer. The data science system 102 enables the user 108, via the client device 104, to perform data science operations. As such, the data science system 102 enables users who are not trained data scientist to easily perform data science operations, as described additionally below. Further, once a user creates a data science operation, the data science system 102 enables users to package the data science operation in a data science package and provide the data science package to a data science marketplace.

The environment 100 also includes a marketplace 110. The marketplace 110 is connected to the data science system 102 and the client device 104 via the network 106. In some embodiments, the marketplace 110 communicates directly with the data science system 102, as shown by the dashed line. Further, in some embodiments, the marketplace 110 is a part or extension of the data science system 102.

The marketplace 110 may be a data science marketplace system that hosts data science packages. For example, the data science system 102 assists the user 108 in creating a data science operation. The data science system 102 additionally packages the data science operation and registers the data science package to the marketplace 110. Further, the data science system 102 retrieves a data science package from the marketplace 110, binds the user's data to the data science algorithm within the data science package, and creates a data science operation customized to the user 108.

As mentioned previously, the data science system 102 generates a data science package based on a data science operation. Before describing the how the data science system 102 generates data science package, on overview of the process of creating and performing a data science operation will be provided with references to FIGS. 2A-2C. After which, an overview of a marketplace is described in references to FIG. 2D. The data science system and the marketplace user interfaces shown in FIGS. 2A-2D are example user interfaces provided by the data science system 102 and the marketplace 110 described with respect to FIG. 1. Further, the client device 104 described above, or another computing device, can display the graphical user interfaces shown in FIGS. 2A-2D. A more detailed description of creating a data science operation is described in co-pending U.S. patent application Ser. No. 15/197,793, which is incorporated by reference herein in its entirety.

Figure 2A:
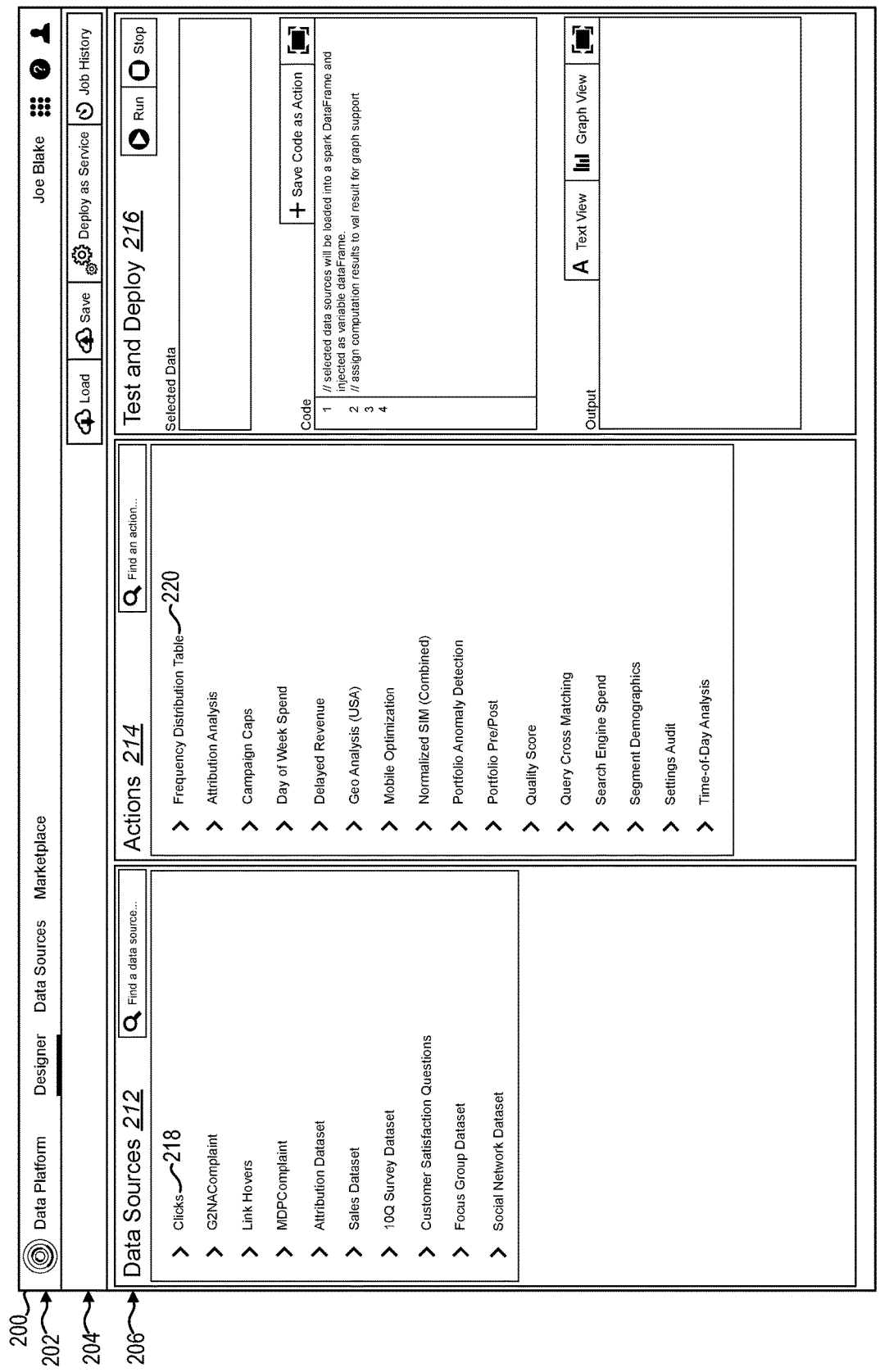

To illustrate, FIG. 2A shows a graphical user interface 200 of a data platform provided by the data science system. As shown, the graphical user interface 200 includes various areas, such as a header 202, a toolbar 204, and a body 206. The header 202 includes navigational elements, user information, and user preferences as well as links to data source settings and services. The header 202 can include additional or fewer elements than shown. The toolbar 204 includes selectable tools that provide various options to a user that enhance the user's experience with the data science system, as further described below.

The body 206 of the graphical user interface 200 includes sections such as a data sources section 212, an actions section 214, and a test and deploy section 216. In general, the data sources section 212 includes a listing of data sources. The data in the data sources section 212 can contain a wide variety of data including, but not limited to, data from keywords searches, survey responses, customer feedback, user behavior modeling, sales data, and web traffic data.

Generally, the data sources displayed in the data sources section 212 correspond to a user/company. For example, a user employs a service (the data science system and/or a third-party) to collect click event data for one or more websites. As the service collects click event data, the service provides the data to the data science system. The data science system stores this data as a data source within the data sources section 212, which the data science system displays to the user. For instance, the "Clicks 218" data source is illustrated as the first data source in the data sources section 212.

As mentioned above, data science involves processing and analyzing large volumes of data. By way of explanation, each data source individually contains large amounts of data. Often, a data source includes potentially billions of data entries, with each entry itself including numerous pieces of data. For example, if the user runs a merchant website, the Clicks 218 data source can include, for each click event, location data of the visitor, timestamps of when a click occurs, the specific website the visitor is on at the time of the click, the product or link being clicked by the visitor, the device used by the visitor, and demographic information about the visitor (if available). Data within each data source may be organized and stored according to a variety of structures or schemas. Further, the Clicks 218 data source can group click events by visitor such that each time a particular visitor visits the website, click event data is collected, even across multiple browsing sessions by the visitor. Thus, as click data is collected over time, and for a number of visitors, the size of the Clicks 218 data source grows.

As shown in FIG. 2A, the actions section 214 includes a list of actions (e.g., data science algorithms) with the first listed action shown as "Frequency Distribution Table 220" (or simply "FDT 220"). Each action in the actions section 214 corresponds to one or more algorithms that the data science system generates. More specifically, each action in the actions section 214 is associated with reusable algorithmic building blocks that assist the data science system in creating a data science operation. For example, when a user selects an action, the data science system uses reusable algorithmic building blocks corresponding to the selected action to build a corresponding data science algorithm, as described in additional detail below.

The test and deploy section 216 within the graphical user interface 200 allows a user to view, test, and modify data science operations. For example, the test and deploy section 216 provides fields that display the data and algorithms included in a data science operation. The test and deploy section 216 also shows the output of a data science operation.

Figure 2B:
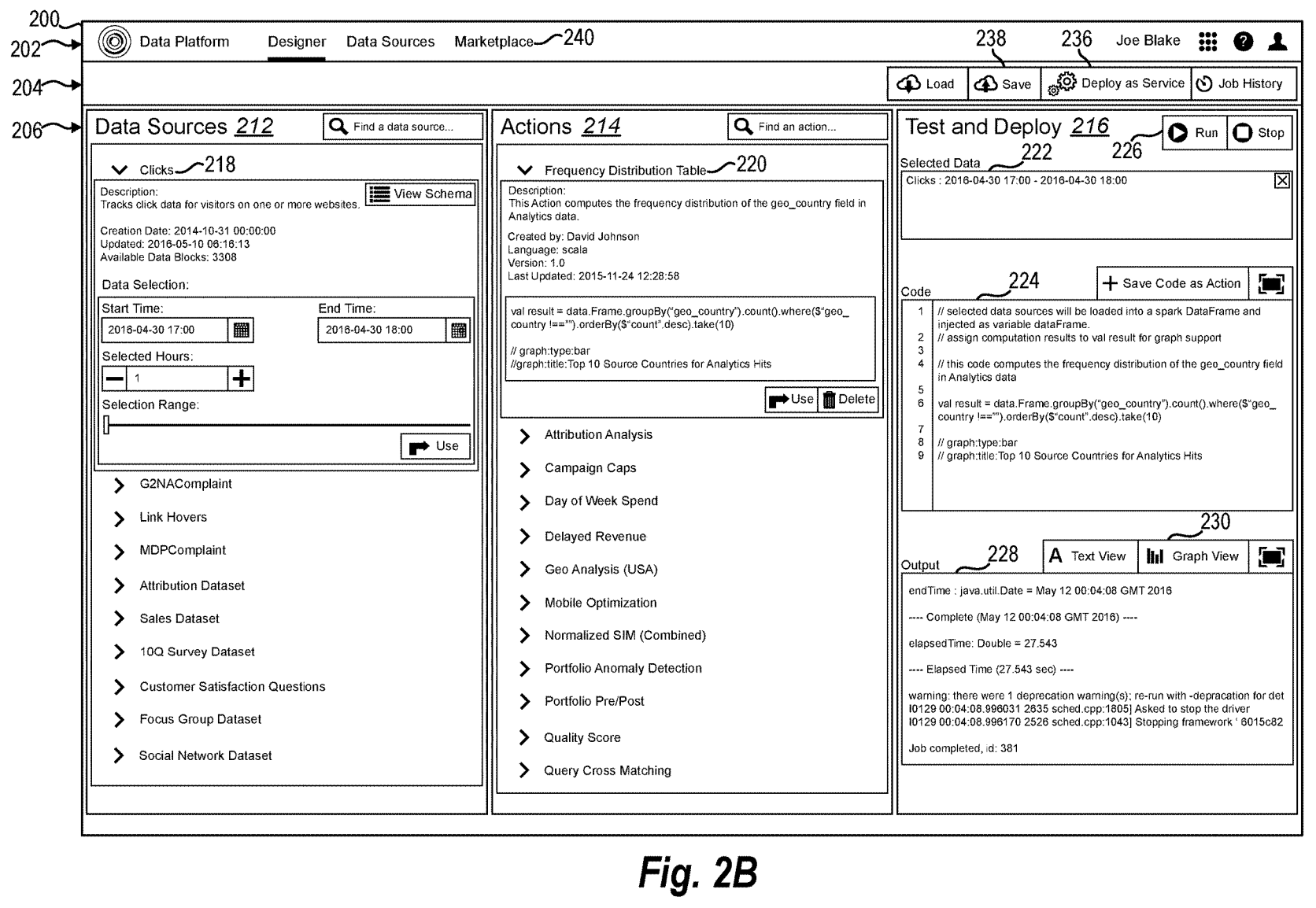

FIG. 2B illustrates a graphical user interface the data science system assisting a user in creating a data science operation. To create a data science operation, a user selects either a data source from the data sources section 212 or an action from the actions section 214. Depending on the user's selection, the user then selects an item from the other section. Thus, if the user first selects a data source, then the user would select an action. Likewise, if a user first selects an action, then the user would select a data source. Further, the data science system enables a user to change their selections at anytime during the creation and testing of a data science operation.

As shown, the user selects the Clicks 218 data source within the data sources section 212. Upon selecting the Clicks 218 data source, the data science system provides the user with information about the selected data source (e.g., a brief summary of the data source, the author of the data source, when the data source was last updated, and the number of data blocks or entries in the data source). In addition, upon selecting the Clicks 218 data source, the data science system provides the user with tools within the data sources section 212 that enable the user to refine his or her selection of data. For example, as shown, the data science system enables the user to specify which data to use from the Clicks 218 data source. Further, while not shown, the data science system may also provide additional tools (e.g., a search field or expression field) that enable the user to filter which data the user is selecting. Thus, upon the user providing a data selection, the data science system references the data and includes the referenced data within the data science operation, as described below.

To create a data science operation from the selected data, the data science system pairs the selected data with an action. As such, after selecting the data source, the user chooses an action from the actions section 214 to apply to the selected data source. For example, as shown in FIG. 2B, the user selects the FDT 220 action. Selecting the FDT 220 action provides the data science system with reusable algorithm building blocks to create an algorithm that computes the frequency distribution of values within a data set field.

Like with selecting a data source, when a user selects an action, the data science system provides additional information about the action within the graphical user interface 200. For example, upon selecting the FDT 220 action, the graphical user interface 200 expands to display a brief summary, required and optional data source inputs, output results types, the author, the language coding, the version, and the last update of the action. Further, the additional information shows a code description of one or more reusable algorithmic building blocks corresponding to the action. One will appreciate that the data science system can provide more or less information to a user within the graphical user interface 200 upon the user selecting an action. In one or more embodiments, the additional information displayed for an action includes descriptor information from the action.

Once data from a data source and an action is selected, the data science system can generate a data science operation. To illustrate, FIG. 2B shows the data science system creating an algorithm to perform a data science operation as displayed in the test and deploy section 216. As mentioned above, the test and deploy section 216 allows a user to create, preview, and execute data science operations as well as view output results.

As mentioned above, the test and deploy section 216 allows a user to view, test, and modify data science operations. More specifically, the test and deploy section 216 includes an input area 222, an algorithm area 224, and an output area 228. The input area 222 lists referenced data based on the user's selection of data from a data source. For example, the input area 222 lists one hour of data selected from The Clicks 218 data source as the referenced data. If the user changes his or her selection of data from a selected data source, the referenced data in the input area 222 updates to reflect the change.

The algorithm area 224 illustrates code that forms the data science operation. As described above, the data science system uses reusable algorithmic building blocks from the selected action to create a data science operation that includes one or more algorithms. As such, the algorithm area 224 displays the code created by the data science system to perform corresponding algorithms.

In some embodiments, the data science system enables a user to edit portions of an algorithm. For example, the data science system provides an additional graphical user interface that indicates which parameters in the algorithm are tunable. For instance, for the given algorithm in FIG. 2B, the data science system provides a graphical user interface to the user indicating that the number of results in the frequency distribution table algorithm is a tunable parameter. As such the user can change the number of results from the default value of ten (10) to another value. In some cases, a tunable parameter does not have a default value and the user must provide a value for the parameter before the data science operation is functional.

In one or more embodiments, the user directly edits portions of the code. For example, the data science system enables the user to change the value of tunable parameters directly in the code of the algorithm. For instance, a user changes the number of results displayed in the code itself. When allowing the user to directly modify the code, the data science system can highlight which portions of code are editable. Further, the data science system can protect other portions of the algorithm such that the user does not incorrectly modify the code that and cause the data science operation not to properly function.

The user runs the data science operation to obtain output results. For example, the user selects the "run" option 226 to execute the code found in the algorithm area 224 and the data science system displays the output results of the operation in the output area 228. As shown, the output area 228 displays the state of the data science operation, the elapsed time, and when the data science operation is complete.

Figure 2C:
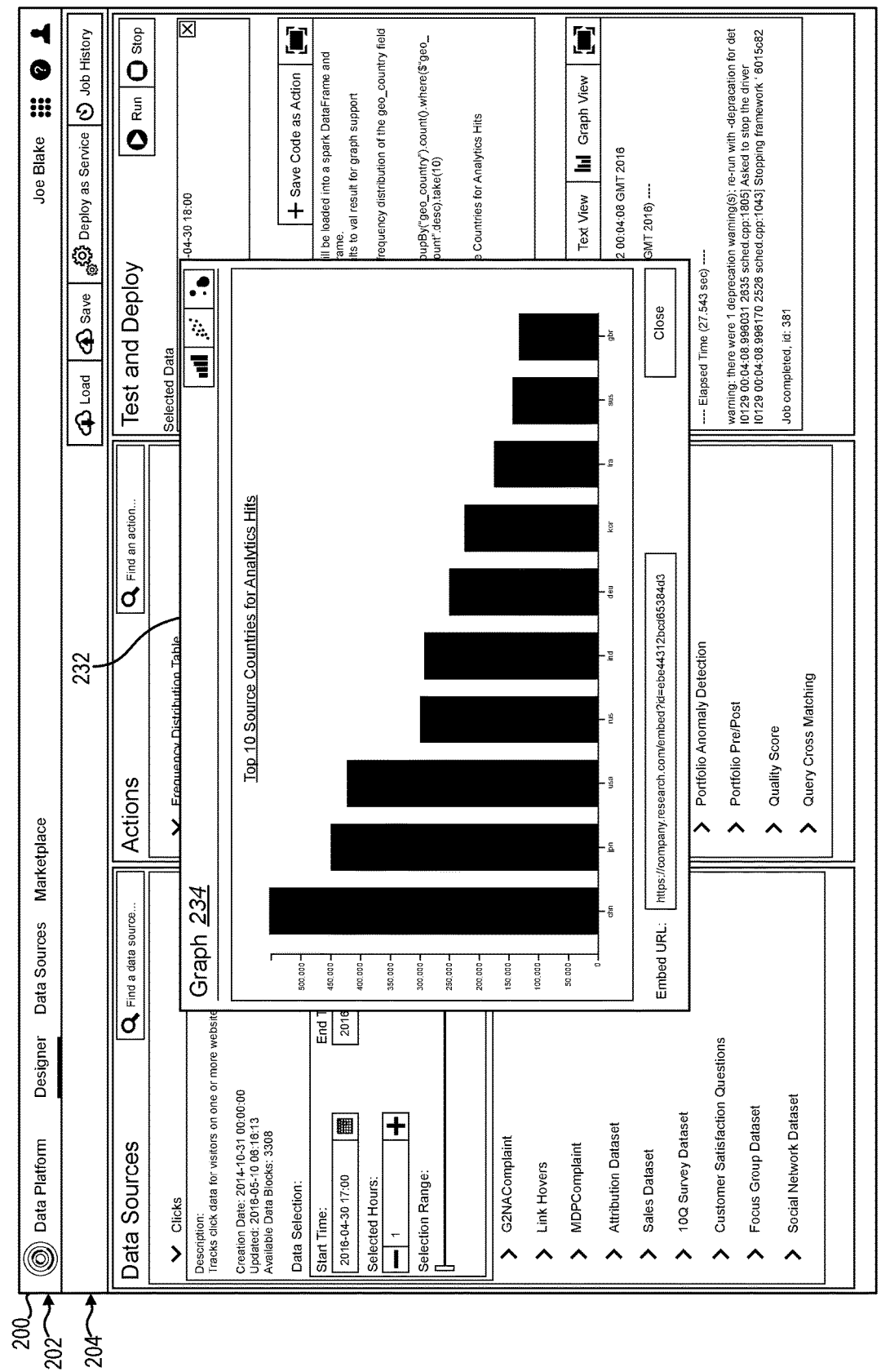

Further, in some embodiments, when the data science system completes a data science operation and the operation includes a visual result, the user selects the visual result option 230 (e.g., the "Graph View" button) to view the results as a graph or other visual result. To illustrate, FIG. 2C shows a results graphical user interface 232 of a bar graph 234 showing the output results of the data science operation. The results graphical user interface 232 includes selectable options to change how the results are presented (e.g., buttons to change the style of the bar graph from a bar graph to a line graph, scatter plot, or another type of graph). In this manner, the data science system provides and/or recommend various visualization outputs to help users better understand the output results.

If the user is not satisfied with the results, the user can return to the test and deploy section 216 and modify the data science operation. For example, the user selects different data to inject into the data science operation. Additionally, the user changes tunable parameters in the data science operation, such as the number of output results. Alternatively, the user selects a different action and causes the data science system to generate a new data science operation in connection with the referenced data.

The user can choose to have the data science system save the data science session. For example, returning to FIG. 2B, the user can select the save option 238 to save the data science session (i.e., state of the user interface) so it can be restored at a future point in time.

If the user is satisfied with the results, the user can return to the test and deploy section 216 and deploy the data science operation as a service. For example, the user selects the "deploy as service 236" option in the toolbar 204, which saves the data science operation as a package. Once the data science system has saved the data science operation as a data science package, the user can later load and run the data science operation within the data science package. Thus, the user can routinely run the data science operation according to parameters specified by the user. For instance, the user specifies to run the data science operation once-per-day using the last 24-hours of collected data from the Clicks 218 data source and the FDT 228 action and to send a copy of the report to the user's email.

Saving a data science operation as a data science package also enables the user to share the data science package with other users. For example, the user provides his or her data science package to a service catalog and/or marketplace. Further, the user can download and/or purchase data science package provided by other users. In this manner, the data science system can inject the user's data with the service downloaded by the user. More detail on creating a data science package is detailed with respect to FIG. 3, described below.

As briefly mentioned, the user provides a data science package to a marketplace. In particular, the user registers a data science package (also called a "data service" or simply "service") with the marketplace. Upon registering a data science package, the marketplace adds the registered data science package among the services offered to users of the data science system. As such, other users can download and/or purchase the data science package. Likewise, the user can download and/or purchase additional data science packages provided by other users.

Figure 2D:
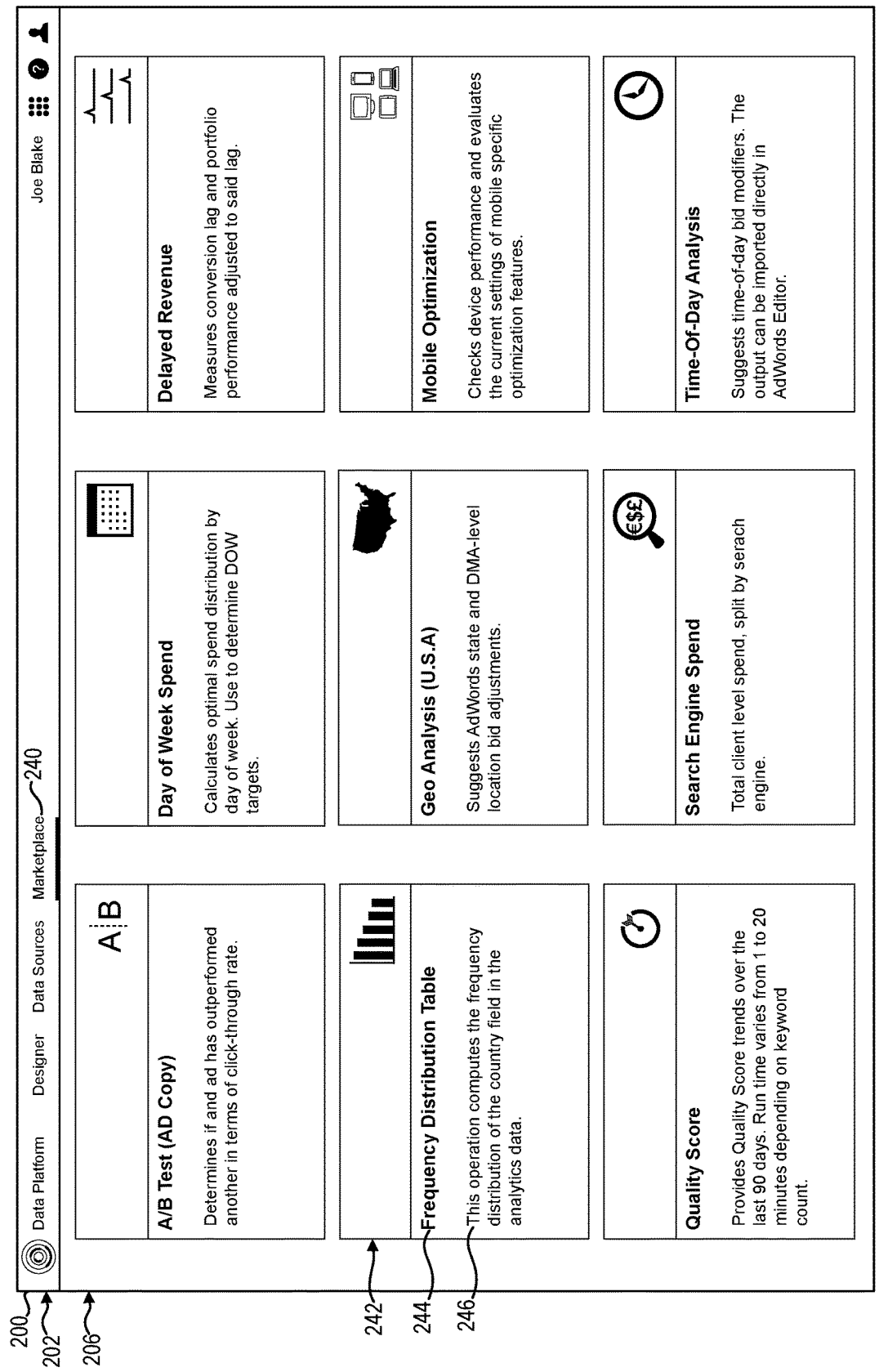

To illustrate, the user selects "Marketplace 240" from the header 202 to view the Marketplace 240 (see FIG. 2B). Upon selecting the Marketplace 240, the graphical user interface 200 updates the body 206 to display the Marketplace, as shown in FIG. 2D. As shown, the Marketplace in FIG. 2D illustrates data science packages. For example, the Marketplace shows Frequency Distribution Table as one of the data science packages 242.

Further, each data science package 242 within the Marketplace includes a title 244 and a brief description 246 of the data science package. Often, the title 244 and the brief description 246 is obtained from a descriptor and/or description associated with the data science operation as part of the registration process. Registering and adding a data science package to a marketplace is described in detail below with respect to FIG. 3.

In one or more embodiments, a user selects a data science package 242 from the Marketplace. The data science system adds the selected data science package to the actions section 214 of the graphical user interface 200 (see FIG. 2B). Then, using the newly obtained data science package, the data science system enables a user to pair the data science package with a data source from the user's data sources. In this manner, and as described above, the data science system creates a customized data science operation. Further, as previously described, the data science system enables the user to modify the data science operation (e.g., customize one or more tunable parameters) to better meet the user's needs.

Figure 3:
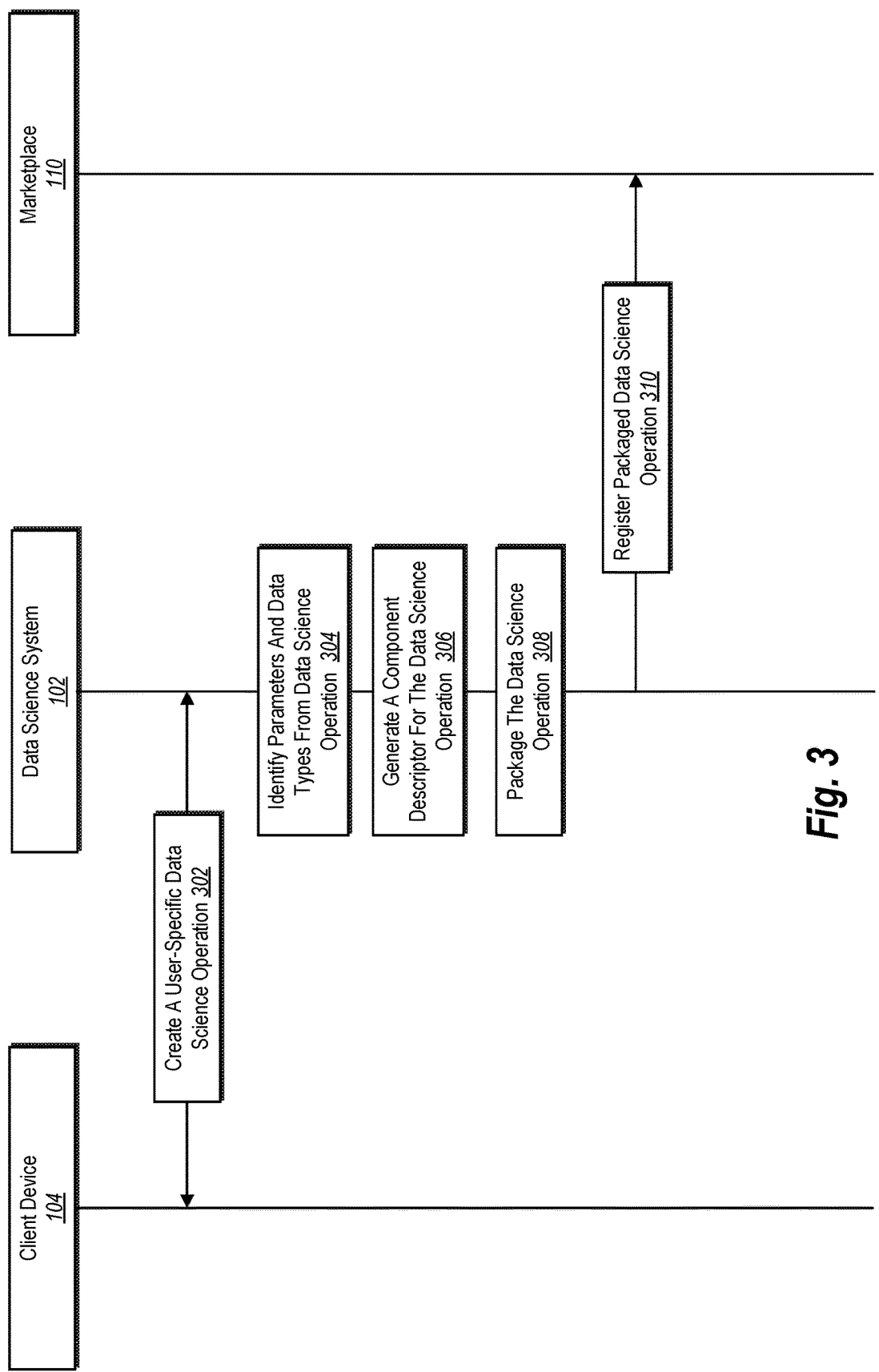
FIG. 3 illustrates an example sequence diagram of the data science system creating a data science package in accordance with one or more embodiments.

FIG. 3 illustrates an example sequence diagram of the data science system creating a data science package in accordance with one or more embodiments. A shown, FIG. 3 includes the client device 104 communicating with the data science system 102 and the marketplace 110. The client device 104 and the marketplace 110 may be examples of the client device 104 and marketplace 110 described with respect to FIG. 1.

As shown in step 302 of FIG. 3, the data science system 102 assists the user in creating a user-specific data science operation. For example, as described above, the data science system 102 generates a customized data science operation based on a user selecting data from a data source and an action to apply to the selected data. In addition, as described above, the data science system 102 provides tools and options to the user to edit and modify the data science operation such that the data science operation is further suited to the user's desires.

After the data science system 102 creates a data science operation, and the user is satisfied with the results, the data science system 102 can package the data science operation into a data science package. In particular, the data science system 102 provides a packaging function that identifies components of a data science package and bundles the components together. In one or more embodiments, the identified components include the referenced data, algorithm code, visualization code, and/or code to bind tunable algorithm parameters to the data science algorithm.

As part of the packaging process, the data science system 102 creates a component descriptor for the data science operation that includes many of the above-listed components. As mentioned above, the component descriptor provides a lightweight container around a data science package that provides a description of the enclosed data science operation. In particular, the component descriptor indicates the parameters and data types needed to operate the data science algorithm within the data science package.

Steps 304-308 in FIG. 3 describe how the data science system 102 packages a data science operation into a data science package. In particular, step 304 illustrates the data science system 102 identifying parameters and data types from the data science operation. For example, the data science system 102 analyzes the data science operation to identify required and optional parameters of a data science algorithm. In some embodiments, the data science system 102 identifies required and optional parameters based on annotations within the data science algorithm and/or data science operation. As an overview, when an author creates reusable algorithm building blocks, he or she often includes annotations that indicate required and optional parameters as well as other information, such as whether a parameter is tunable (e.g., customizable by a user). Then, when the data science system 102 creates a data science algorithm from the reusable algorithm building blocks, the annotations are carried over into the data science algorithm. Accordingly, the data science system 102 identifies required and optional parameters based on annotations within the data science algorithm and/or data science operation.

In additional, and/or alternative embodiments, the data science system 102 identifies required and optional parameters of a data science algorithm by parsing and analyzing the data science algorithm. For example, the data science system 102 scans the data science algorithm to identify parameters and determines whether the parameter is necessary for the data science algorithm to operate, or if the parameter merely enhances the output of the data science algorithm (e.g., an optional parameter).

In one or more embodiments, the data science system 102 analyzes the data science algorithm at the time the data science operation is created, at which time, the data science system 102 identifies the required and optional parameters of the data science algorithm. In these embodiments, the data science system 102 references the required and optional parameters rather than reanalyzing the data science algorithm when packaging the data science operation.

In addition to identifying parameters, the data science system 102 also identifies data types from the data science operation. For instance, the data science system 102 analyzes the data referenced in the data science operation to determine the types of data being used. In some embodiments, the data science system 102 refers to a data source schema for the selected data source from which the referenced data is chosen to identify one or more data types. Further, in some embodiments, the data science system 102 uses annotations in the data science operation, as described above, to identify the data types.

Upon the data science system 102 identifying parameters and data types, the data science system 102 generates a component descriptor for the data science operation, as shown in step 306. As mentioned above, the component descriptor provides information and instructions about a data science operation that enables the data science system 102 to execute the data science operation using data from another data source. Further, the data science system generates a component descriptor using a lightweight container technology such that, when bundled with a data science package, the data science system is able to quickly load the data science package to a registry and rapidly execute the customized data science operation.

As part of generating a component descriptor, in one or more embodiments, the data science system 102 includes a description of the data science operation, the required parameters, and the optional parameters in the component descriptor. For example, the data science system 102 parses information from the title, description, author and version from the data science algorithm within the data science operation and the information within the component descriptor. By including the parameters and data types used in the data science operation, the data science system 102 can determine whether one or more data sources includes compatible data (e.g., data matching the data type used in the data science operation).

Listing 1 below provides a sample component descriptor created by the data science system 102. As shown, the component descriptor corresponds to a data science operation that performs a frequency distribution table, such as the data science operation described above with respect to FIG. 2B.

---

Listing 1

```
"descriptor component" :{
    "name": "Frequency Distribution Table",
    "version": "1.0.7",
    "type": "action",
    "lang": "scala",
    "descriptorVersion": "2.0.1"
    "description": "This action computes the frequency distribution of a field in a dataframe, and provides the top N field values by frequency",
    "parameters": {
        "selectedElement": {
            "type": "jsonpath",
            "label": "Selected Field",
            "placeholder": "Field Name",
            "default" : "geo_country"
        },
        "rankingsLength": {
            "type": "integer",
            "label": "Rankings Size",
            "placeholder": "Rankings Size (Top N)"
            "default" : 10
        }
    },
    "input": {
        "format" : "dataFrame",
        "required" : {
            "*" : "any"
        }
    },
    "output": {
        "items": {
            "type": "string[ ]",
            "label": "Array of ranked item values",
            "selector": "$ . . obj"
        },
        "counts": {
            "type": "integer[ ]",
            "label": "Array of item frequency counts",
            "selector": "$..count"
```

-continued

Listing 1

```
      }
   }
}
```

As shown in Listing 1, the parameters section of the component descriptor contains tunable algorithm parameters as detected by annotations within the algorithm code of the data science operation. In particular, the component description indicates a parameter that requires user input specifying the frequency distribution field and the number of ranked items to display. If the user does not provide values, however, the component descriptor indicate that the frequency distribution field defaults to the value of "geographic country" and the number of ranked items defaults to value of "10."

The input section in Listing 1 contains the expected format of the input data and required data types as detected by annotations within data science operation. In particular, the component descriptor indicates that a dataframe format (i.e., data type) is required to perform the frequency distribution, but that the input schema field may be any type. Note, the any type indication is specified using the wildcard "*" for the field name and the type "any" for the input schema field type in Listing 1. In some cases, the component descriptor specifies a more restrictive declaration, such as specifying a field by exact name and type, or a set of acceptable names and/or types. For example, the component descriptor specifies a declaration using a regular expression format.

The output section in Listing 1 defines the output schema of the data science operation, In particular, the component descriptor specified the output "type" field within the algorithm code of the data science operation. As shown in the component descriptor, the output of the data science operation is stored in two variables: "items" of type string array, and "counts" of type integer array. These declarations allow the data science system to capture the output results of the data science operation and store them for later visualizations and subscriptions.

As described above, in one or more embodiments, information such as a description of a data science algorithm is included in the component descriptor. For example, the data science algorithm's name, version, type, language, and description are all included in the component descriptor. Further, the descriptor indicates input parameters needed to perform the data science operation and the resulting output parameters.

In additional embodiments, the component descriptor includes binding information. Binding information enables the data science system 102 to bind compatible data from any user to the data science algorithm within the data science package. In particular, the binding information provides information regarding the data that the data science algorithm expects to receive and the variables in the data science algorithm to which the referenced data should be bound.

Returning to FIG. 3, in step 308, the data science system 102 packages the data science operation. In one or more embodiments, the data science system 102 bundles the component descriptor, the data science operation (which includes the referenced data and the data science algorithm), and the visualization code into a data science package. As mentioned above, a data science package can also include the binding information. In general, a data science package includes all the necessary components for another user to run the data science operation with compatible data.

In one or more embodiments, packaging a data science operation into a data science package includes wrapping the data science package with the component descriptor. Wrapping the data science package with the component descriptor provides a number of benefits. For example, as mentioned above, when a data science package is wrapped with the component descriptor, the data science system quickly loads the data science package to a registry and rapidly executes the customized data science operation. The decrease in processing time occurs because the component descriptor serves as a lightweight container that provides metadata (e.g., information and structure) regarding the data science operation, and in particular, the data science algorithm.

Another benefit of the component descriptor serving as a lightweight container for a data science package is that the data science system 102 or another system can quickly ascertain the contents of the data science package and whether data from a data source is compatible without needing to unpack the data science package. Further, as described above, by providing a lightweight metadata container, the component descriptor enables the data science system to quickly determine whether the data science package is suitable for a user's needs and compatible with existing data.

In step 310, the data science system 102 registers the packaged data science operating with the marketplace 110. In one or more embodiments, as part of the registration process, the marketplace 110 obtains information about the data science package from the component descriptor. As described above, the component descriptor includes the title, a brief description, the functionality, and required data types of the packaged data science operation. Thus, the marketplace 110 registers the data science package using only the component descriptor and without un-packaging the data science package.

Once the marketplace 110 registers a data science package, the marketplace 110 displays the data science package to other users (see FIG. 2D). Further, the marketplace 110 may use the information from the component descriptor to provide information to users viewing data science packages within the marketplace 110. For example, the marketplace 110 displays the title and a brief description of a data science package to other users as listed in a component descriptor.

In some embodiments, the marketplace 110 filters the data science packages that are displayed and/or recommended data science packages based on information within a component descriptor. For example, the marketplace 110 obtains/identifies data sources that are to be used. The marketplace 110 then compares data types from the data sources to the data types within the component descriptors for each data science package. Based on the comparison, the marketplace 110 displays only data science packages that are compatible with the data. In this manner, the marketplace 110 displays data science packages that pair with data currently belonging to a user.

In a number of embodiments, the data science system includes visualization code. Listing 2, provided below, illustrates a sample of visualization code that the data science system 102 includes in a data science package to display a bar graph. One will appreciate that the data science system 102 can employ other visualization codes. Further, one will appreciate that in some embodiments the data science system 102 has visualization codes embedded within the data science system 102, and thus including visualization code in a data science package is not necessary.

Listing 2

```
"visualization code" :{
    "name": "Labeled vertical bar graph",
    "version": "1.1.1",
    "type": "graph",
    "style": "bar",
    "lang": "d3",
    "descriptorVersion": "2.0.1",
    "description": "A reference implementation of a labeled vertical bar
graph, implemented in D3 and JavaScript. The numbers of bars in the
graph is determined by the size of the dimensionArray.",
    "parameters": {
        "labelArray": {
            "type": "string[ ]",
            "label": "X-Axis label Array"
        },
        "dimensionArray": {
            "type": "integer[ ]",
            "label": "Y-Axis dimension Array"
        }
    },
    "input": {
        "type" : "json",
        "required" : {
            "+" : "string[ ]",
            "+" : "integer[ ]"
        }
    },
    "output": {
        "type" : "graph",
        "style" : "bar"
    }
}
```

Listing 2, like Listing 1, includes description information, a parameters section, an input section, and an output section. The parameters section, the input section, and the output section specify the data types used in the visualization code and how the data types are incorporated into a data science operation. Using the visualization code, the data science system 102 provides a visual output to the user. With respect to Listing 2, the visualization code enables the data science system 102 to generate and display a bar graph.

Figure 4:
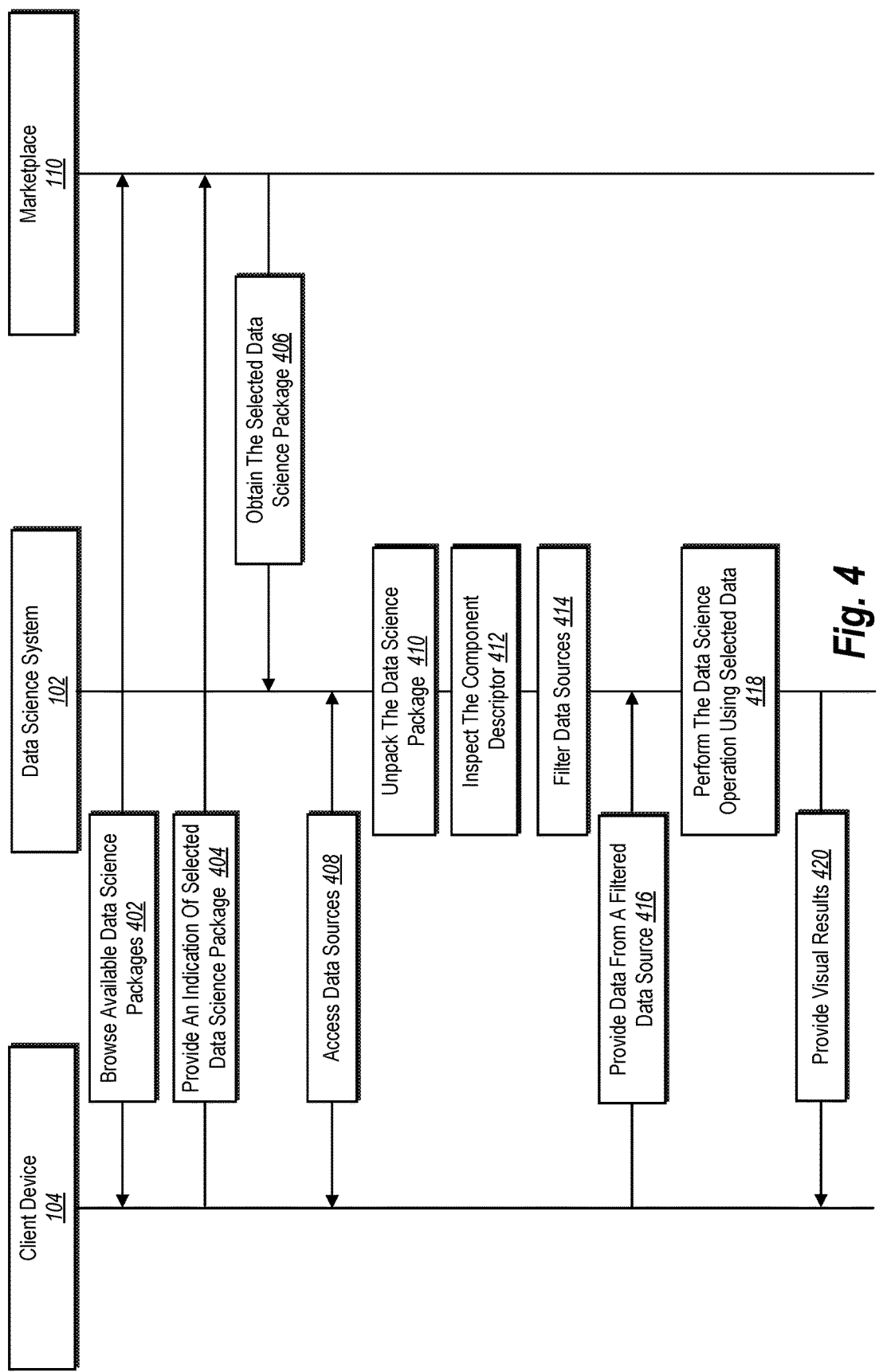
FIG. 4 illustrates an example sequence diagram of applying a data science package in accordance with one or more embodiments.

As mentioned above, upon a user selecting a data science package, the data science system 102 generates and runs a data science operation using data provided by the user. This process is further described in FIG. 4, which illustrates an example sequence diagram of executing a data science package in accordance with one or more embodiments. As shown, FIG. 4 includes the client device 104 communicating with the data science system 102 and the marketplace 110.

In step 402, a user browses available data science packages in the marketplace 110. In particular, the marketplace 110 provides a listing of available data science packages to the client device 104 associated with the user. As described above, the marketplace 110 may filter out data science packages based on data at the client device 104. Further, the marketplace 110 can recommend data science packages to the user, for example, based on what types of data at the client device 104 or based on goals or search terms provided by the user. Further, the marketplace 110 provides search functionality (e.g., by name, description, functionality, or author) to the user to assist the user in identifying a particular data science package.

After browsing the available data science packages, the user selects a data science package. The client device 104 provides an indication of the selected data science package to the Marketplace 101, as shown in step 404. Selecting a data science package may involve the user purchasing the data science package. Alternatively, selecting a data science package involves the user accessing the data science package at no cost, or on a limited basis.

Upon the user selecting the data science package, the marketplace 110 may provide the selected data science package to the data science system 102. In other words, as shown in step 406, the data science system 102 obtains the selected data science package from the marketplace 110. For example, the data science system 102 adds or otherwise associates the selected data science package to a user's account within the data science system 102. In another example, the data science system 102 provides (via download) a copy of the selected data science package to the client device 104. In some embodiments, the marketplace 110 belongs or is otherwise associated with the data science system 102, so the data science system 102 already has access to any selected data science package.

In step 408, the data science system 102 accesses data sources of the user from the client device 104. In some embodiments, the data science system 102 stores data sources remotely. For example, data within the data sources for a user may be maintained on a network storage device associated with the data science system 102. Regardless of where the data sources for a user are stored, the data science system 102 analyzes the data within the data sources upon gaining access. For example, the data science system 102 analyzes a user's data sources to identify the data types included in each data sources. In some embodiments, the data science system 102 analyzes a data schema associated with each data source to identify the structured and data types included in a data source.

In step 410, the data science system 102 unpacks the data science package. As part of un-packaging the data science package, the data science system 102 identifies the various components within the data science package. For example, the data science system 102 identifies the component descriptor, the data science operation, and the visualization code within the data science package. In addition, the data science system 102 can identify a data science algorithm from the data science operation.

In step 412, the data science system 102 analyzes the component descriptor. In particular, the data science system 102 analyzes the component descriptor to identify required and optional parameters, as well as the data types of the parameters. The data science system 102 then uses the component descriptor to filter data sources based on which data sources include compatible data, as shown in step 414. For example, the data science system 102 compares data types identified in the component descriptor with data types in each data source to identify matching data types. By filtering data sources for a user, the data science system 102 eliminates the situation where the user attempts to select a data source that does not include compatible data.

The client device 104 provides data from a filtered data source, as step 416 illustrates. In particular and as described above, the user selects a data source from the list of filtered data sources. The user further selects data from within the selected data source, which the client device 104 provides to the data science system 102, for example, as referenced data.

In some embodiments, once the user selects the data, the data science system uses the component descriptor to bind the selected data to the data science algorithm to generate a customized data science operation. Specifically, the data science system 102 uses the component descriptor to bind the selected data to the required inputs of the data science algorithm. For example, the component descriptor comprises binding information that indicates which data types in the selected data to bind to which variables within the data science algorithm. In this manner, the data science system 102 injects the user's data into the data science algorithm from the data science package. Further, depending on the number of tunable and/or optional parameters, the user can further modify and customized the data science operation.

In step 418, the data science system 102 performs the customized data science operation using the selected data. The data science system 102 provides visual results to the client device 104, as shown in step 420. The output shows the result of the data science package selected in the marketplace 110 applied to data belonging to the user.

As described herein, the data science system 102 enables the user to achieve results customized to the user and their data with minimal input from a user. As described previously, a user need only select a data science package from the marketplace 110 and compatible data from a data sources. With the user's selections, the data science system 103 can execute customized data science operations. As such, the data science system 102 greatly simplifies the process of performing a data science operation and obtaining visual results—a process that has traditionally been very complex and difficult to accomplish, even for experienced users.

In addition to generating a component descriptor for a data science package, in some embodiments, the data science system 102 also generates a service descriptor for the data science package. For example, the data science system 102 generates a service descriptor for data science packages that include multiple data science algorithms within a data science operation. For instance, when a data science package includes multiple data science algorithms, the data science package often includes multiple component descriptors, which can create conflicts. As such, a service descriptor serves as an additional container that packages the multiple component descriptors together within a data science package.

FIG. 5 illustrates an example graphical interface showing the data science system generating a service component. FIG. 5 generally illustrates the graphical user interface 200 described above with respect to FIG. 2A. For example, the graphical user interface 200 includes the header 202, the toolbar 204, and the body 206. Further, as described above, the body 206 of the graphical user interface 200 includes a data sources section 212, an actions section 214, and a test and deploy section 216. In particular, the data sources section 212 displays a list of data sources and the actions section 214 displays a list of actions.

As mentioned above, in some embodiments, a data science operation includes more than one data science algorithm. For example, a data science operation includes two algorithms, where the output of the first data science algorithm serves as the input for the second data science algorithm. In other words, the required input for the second data science algorithm matches the output of the first data science algorithm. As a result, both data science algorithms process data that is input into the data science operation before outputting a single set of results. Alternatively, some data science operations include multiple data science algorithms that run in parallel rather than in serial, such that the output results are displayed in connection with one another.

To illustrate the data science system creating a data science operation that employs multiple data science algorithms, FIG. 5 shows the user selecting the Clicks 218 data source from the data sources section 212 and the FDT 220 action from the actions section 214. Upon detecting the user selections, the data science system analyzes the data within the Clicks 218 data source against the FDT 220 action to determine if additional actions are available. In some embodiments, the data science system determines additional actions 550 that are available based on the output of an additional action being compatible with the input for the FDT 220 action or vice versa.

As shown, the data science system 102 identifies and displays additional actions 550 within the actions section 214 of the graphical user interface 200. Each additional action shown in FIG. 5 pairs with the selected action (i.e., FDT 220). As such, the user can further select one or more additional actions to perform on the Clicks 218 data source in connection with the FDT 220 action. In one example, the user selects the additional action "Data Validation Filter," which filters out invalid data before performing the FDT 220 action. In another example, the user selects "Data Categorization," which groups the data by category type after performing the FDT 220 action.

While not illustrated, upon selecting an additional action, the graphical user interface 200 can display additional information about the additional action. The additional information may be comparable to the additional action that the data science system displays when a user selects an action, as described above with respect to FIG. 2B. For example, the graphical user interface 200 shows a brief description of the additional action, whether the additional action is performed before or after the primarily selected action, and other information.

Upon the user selecting an additional action from the additional actions 550, the data science system creates a data science operation. For example, the data science system creates the two data science algorithms using the reusable algorithm building blocks associated with each selected action. In the case that the data science algorithms run in serial, the data science system only injects the selected data into the first data science algorithm, and the output from the first data science algorithm is provided to the second data science algorithm as input. Otherwise, if the data science algorithms run in parallel, the data science system injects selected data into both algorithms.

As described above, the data science system may prompt the user for input to complete the data science operation. For example, the data science system prompts the user for input regarding a tunable and/or optional parameter. For instance, if the user selected "Data Categorization" as the additional action, the data science system prompts the user as to which categories (identified from the data) to include in the output results. Then, using the inputs provided by the user, the data science system generates a data science operation.

Because the data science operation includes multiple data science algorithms, the data science system generates additional code that integrates the two data science algorithms together within the data science operation. To illustrate, Listing 3, shown below, provides sample integration code that combines to the Data Validation Filter additional action with the FDT 220 action. In other words, as shown in Listing 3, the data science system combines a data science algorithm associated with the Data Validation Filter (or "DVF algorithm") with a data science algorithm associated with the FDT 220 action (or "FDT algorithm").

Listing 3

```
// service:bind:dataFrame:dataframe
// service:bind:selectedElement:column
// service:bind:rankingsLength:integer
val selectedElement = "geo_country"
```

Listing 3

```
val requiredColumns = Array(selectedElement)
val size = 10
val dataFrame1 = dataFrame.where($requiredColumns !== "")
val result =
dataFrame1.groupBy(selectedElement).count(
).orderBy($"count".desc).take
(rankingsLength)
// graph:type:bar
// graph:data:result
// graph:title:Top 10 Source Countries for Analytics Hits
```

As shown, Listing 3 includes parameters such as required inputs of the DVF algorithm and the FDT algorithm. Listing 3 also shows instructions to run the respective algorithms. Further, as shown in Listing 3, the output of the DVF algorithm is used as the input of the FDT algorithm and running the FDT algorithm generates the "result" parameter.

Once the data science operation is generated, the data science system runs the data science operation and provides the output results to the user. As described previously, the user edits and modifies the data science operation until he or she achieves the desired output results. When the user is satisfied with the output results, the user saves the data science operation and/or deploys the data science operation as a service.

Further, after obtaining the data science operation, the data science system generates the multiple component descriptors (described above) and the service descriptor that wraps around the multiple component descriptors and specifies how the multiple data science algorithms cooperate with each other within the data science operation.

As mentioned above, the service descriptor provides description and structure for components within the data science package. As an example, in some embodiments, the service descriptor maps the selected data to the input of a first data science algorithm, maps the output from the first data science algorithm to the input of a second data science algorithm, and maps the output of the second data science algorithm to the visualization code, which outputs a visual result. In other examples, the service descriptor maps the selected data to inputs of both the first data science algorithm and the second data science algorithm as well as indicates how the outputs of the two data science algorithms combine to provide a correlated result.

Figure 6:
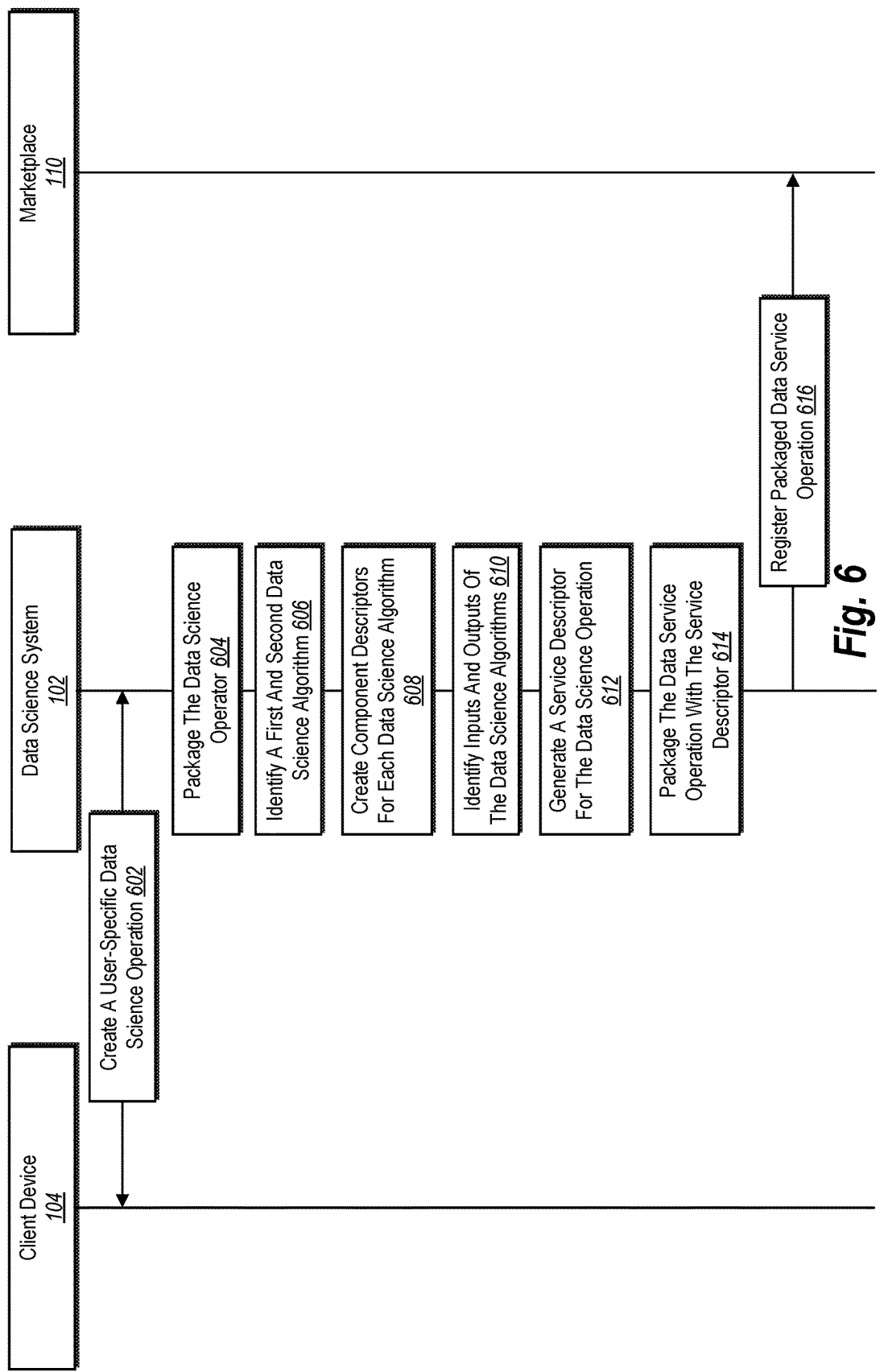
FIG. 6 illustrates an example sequence diagram of creating a data science package in accordance with one or more embodiments.

FIG. 6 provides a detailed example of the data science system packaging (i.e., combining or bundling) the data science operation based on the user selecting the Clicks 218 data source, the FDT 220 action, and the Data Validation Filter additional action. FIG. 6 and related described help describe how the data science system packages/combines a data science operation that includes multiple data science algorithms and generates a corresponding service descriptor that envelopes the data science package. As shown, FIG. 6 includes the client device 104 communicating with the data science system 102 and the marketplace 110.

In step 602, the data science system creates a user-specific data science operation. As described above, the data science operation includes multiple data science algorithms. Further, as shown in step 604, the user selects the option to package/group the data science operation into a data science package.

Upon receiving the packaging request, the data science system identifies the data science algorithms within the data science operation, as step 606 illustrates. In particular, the data science system first identifies the DVF algorithm and the FDT algorithm within the data science operation, as described above with respect to Listing 3. Based on identifying the DVF algorithm and the FDT algorithm, the data science system creates component descriptors for both data science algorithms, as shown in step 608. The data science system may create the component descriptors as described above.

For example, Listing 1, provided above, shows a sample component descriptor for the FDT algorithm based on the FDT 220 action. Listing 4, provided below, provides a sample component descriptor for the DVF algorithm based on the Data Validation Filter additional action.

Listing 4

```
"component descriptor" : {
    "name": "Data Validation Filter",
    "version": "1.0.11",
    "type": "action",
    "lang": "scala",
    "descriptorVersion": "2.0.1",
    "description": "This action filters an input dataframe and removes any
rows with null values in any of the specified columns. The output is the
set of rows within the dataframe with non-null values in the specified
columns.",
    "parameters": {
        "requiredColumns": {
            "type": "column[ ]",
            "label": "Columns required to be non-null",
            "placeholder": "Column array"
        },
    },
    "input": {
        "name" : "dataFrame",
        "type" : "dataframe",
        "required" : {
            "*" : "any"
        }
    },
    "output": {
        "type" : "dataframe",
        "*" : "any"
    }
}
```

As with Listing 1, Listing 4 includes description information, a parameters section, an input section, and an output section. As described above, the parameters section, the input section, and the output section specify the data types used in the component descriptor and how the data types are incorporated into a data science operation. For example, the component descriptor specifies which data types are required for input and the data types that are output from running the corresponding data science algorithm.

In step 610, the data science system identifies inputs and outputs of the multiple data science algorithms. In particular, the data science system uses the component descriptors to identify required and optional inputs for each data science algorithm as well as expected outputs. Further, the data science system identifies the data types for each of the inputs and outputs. In addition, the data science system 102 uses the respective component descriptors to identify tunable parameters in each data science algorithm.

In step 612, the data science system generates a service descriptor for the data science operation. In particular, the data science system uses the two component descriptors to generate the service descriptor. In one or more embodiments, the data science system collects parameter declarations from each component descriptor. Further, the data science system uses portions of the integration code (shown in Listing 3 above) to create the service descriptor. For example, the data science system analyzes annotations in the integration code to identify binding information (e.g., code having the form "// service:bind:<name>:<type>"). In addition, in some embodiments, the data science system uses annotations from the visualization code in the service descriptor (shown above in Listing 2).

Listing 5 below illustrates a sample service descriptor created by the data science system for the data science operation generated in connection with FIG. 5.

---
Listing 5
---
```
"service component" : {
    "name": "Frequency Distribution Bar Graph Service",
    "description" : "Top 10 Source Countries for Analytics Hits",
    "version": "1.0.0",
    "type": "service",
    "lang": "scala",
    "descriptorVersion": "2.0.0",
    "bindings": {
        "dataFrame": {
            "type": "dataframe",
            "label": "dataFrame",
            "required" : {
                "*" : "any"
            }
        },
        "selectedElement": {
            "type": "column",
            "label": "Selected Field",
            "placeholder": "Field Name",
            "default" : "geo_country"
        },
        "rankingsLength": {
            "type": "integer",
            "label": "Rankings Size",
            "placeholder": "Rankings Size (Top N)"
            "default" : 10
        }
    },
    "output": {
        "type" : "graph",
        "style" : "bar"
    }
}
```
---

As shown, Listing 5 includes description information, a binding information section, and an output section. The description information includes descriptions from the component descriptors. The binding information section, which indicates input parameters, provides data one or more binding declarations(e.g., structural and descriptive elements provided in the "bindings" section of the service component, which allow data in a data source to be bound to the various components to form a data science operation.), as used in the component descriptors and the integration code. The output section indicates that the output data type is compatible with the visualization code provided above in connection with Listing 2.

After creating the service descriptor, the data science system packages/combines the data science operation, as shown in step 614. For example, the data science system bundles the data science operation (which includes the integration code for the two data science algorithms), the multiple component descriptors, and the visualization code. In some embodiments, packaging involves compressing and/or indexing the contents of the data science package to reduce the size of the data science package. Further, the data science system wraps the data science package together with the service descriptor. In particular, the data science system tags the service descriptor with the data science package, and in the case that the data science package is compressed, the service descriptor remains uncompressed so that it can be easily accessed and read.

As described above, in some embodiments, the data science system provides the data science package to the marketplace 110. In particular, the data science system registers the data science package with the marketplace 110, as step 616 illustrates. When a data science package is wrapped with a single component descriptor, the marketplace 110 uses the component descriptor to register and display the data science package. Likewise, when a data science package is wrapped with a service descriptor, the marketplace 110 uses the service descriptor to register and display the data science package within the marketplace 110.

In some embodiments, registering a data science package with the marketplace includes indexing the data science package into the marketplace. In particular, indexing includes creating a unique identifier for the data science package, uploading the data science package to a marketplace database in connection with the unique identifier, and associating information from the service component with the unique identifier within the marketplace database. Once indexed, the marketplace can organize and display registered/indexed data science packages to other users browsing the marketplace.

Figure 7:
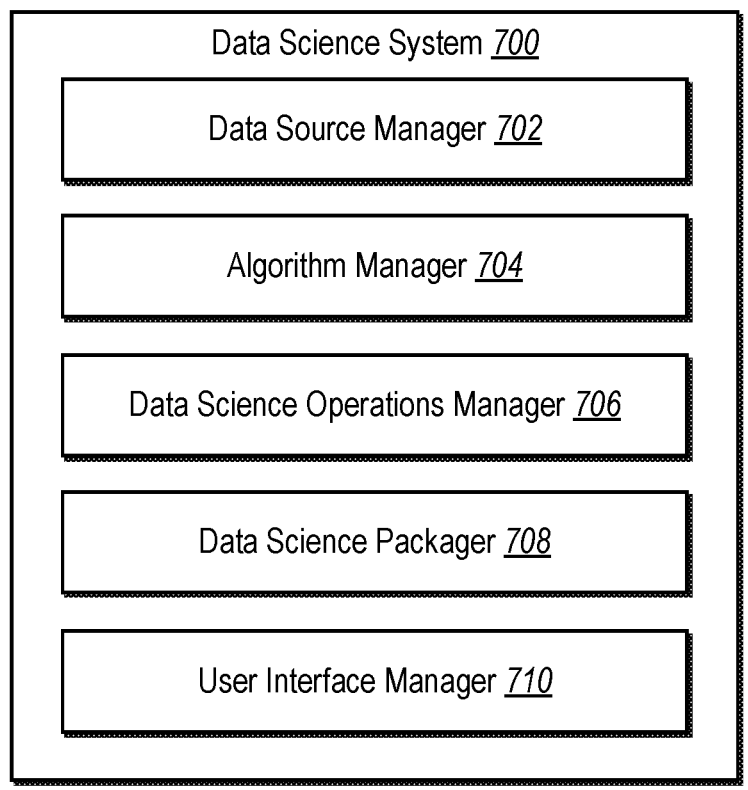
FIG. 7 illustrates an example schematic diagram of the data science system in accordance with one or more embodiments.

FIG. 7 illustrates an example schematic architecture diagram of a data science system 700. The data science system 700 can be an example embodiment of the data science system 102 described above. One or more computing devices (e.g., server devices) implement the data science system 700. Additional details with respect to computing devices are discussed with respect to FIG. 11 below.

As shown in FIG. 7, the data science system 700 includes various components for performing the processes and features described herein. For example, in the embodiment shown in FIG. 7, the data science system 700 includes a data source manager 702, an algorithm manager 704, a data science operations manager 706, a data science package 708, and a user interface manager 710.

The components 702-710 of the data science system 700 can comprise software, hardware, or both. For example, the components 702-710 can comprise one or more instructions stored on a computer-readable storage medium and executable by processors of one or more computing devices, such as a client device or server device. When executed by the one or more processors, the computer-executable instructions of the data science system 700 can cause the computing device(s) to perform the feature learning methods described herein. Alternatively, the components 702-710 can comprise hardware, such as a special purpose processing device to perform a certain function or group of functions. Alternatively, the components 702-710 of the data science system 700 can comprise a combination of computer-executable instructions and hardware.

As mentioned above, the data science system 700 includes the data source manager 702. In general, the data source manager 702 manages a user's data sources. As described above, the data source manager 702 receives data sources from third-party services or facilitates a user in collecting data for a data source via the data science system 700. When additional data is received, the data source manager 702 updates the corresponding data source.

The algorithm manager 704 manages the creation of data science algorithms. In addition, the algorithm manager 704 assists a user in selecting an action and creating a data science algorithm from reusable algorithm building blocks associated with the selected action. Further, the algorithm manager 704 identifies and provides additional actions that are compatible with a selected action, as described above. In some embodiments, the algorithm manager 704 facilitates a user downloading and/or purchasing actions from a repository (e.g., a service catalog or marketplace). Further, the algorithm manager 704 assist users in creating and storing new actions.

The data science operations manager 706 (or simply "operations manager 706") creates and executes data science operations. For example, when a user selects a data source and one or more actions, the data source generates one or more data science operations algorithms, as described above. In some embodiments, the operations manager 706 prompts the user to provide required or optional input regarding one or more tunable parameters.

The operations manager 706 also executes the data science operation to achieve output results with respect to the selected data source and action. If the user does not achieve the desired result, or desires another result, the operations manager 706 allows the user to modify one or more parts of the data science operation. For example, the operations manager 706 provides tools to the user to change tunable parameters within the data science operation and re-run the data science operation.

The operations manager 706 may output various types of results. In one or more embodiments, the operations manager 706 outputs a visual result, such as a graph or chart. In alternative embodiments, the operations manager 706 outputs data that serves as input for another action. For example, the operations manager 706 performs multiple algorithms in serial using the output data from the first action as input data in the second action before outputting a visual result, as described above. Also as described above, the operations manager 706 can also save and load data science operations via data science packages.

The data science packager 708, in general, packages data science operations. For example, as described above, the operations packager 708 creates a data science package of a data science operation. The data science packager 708 also enables a user to add the packaged service to a marketplace. Further, the data science packager 708 deploys a data science operation as a service in connection with the operations manager 706.

The user interface manager 710, in general, displays a graphical user interface to a user. In one or more embodiments, the graphical user interface is an intelligent interface that interacts with a user to create data science operations. In addition, the user interface manager 710 provides prompts (e.g., in an additional graphical user interface) that help guide a user through the process of creating and modifying a data science operation. Further, the user interface manager 710 displays visual results outputted by the data science operations manager 706.

Figure 9:
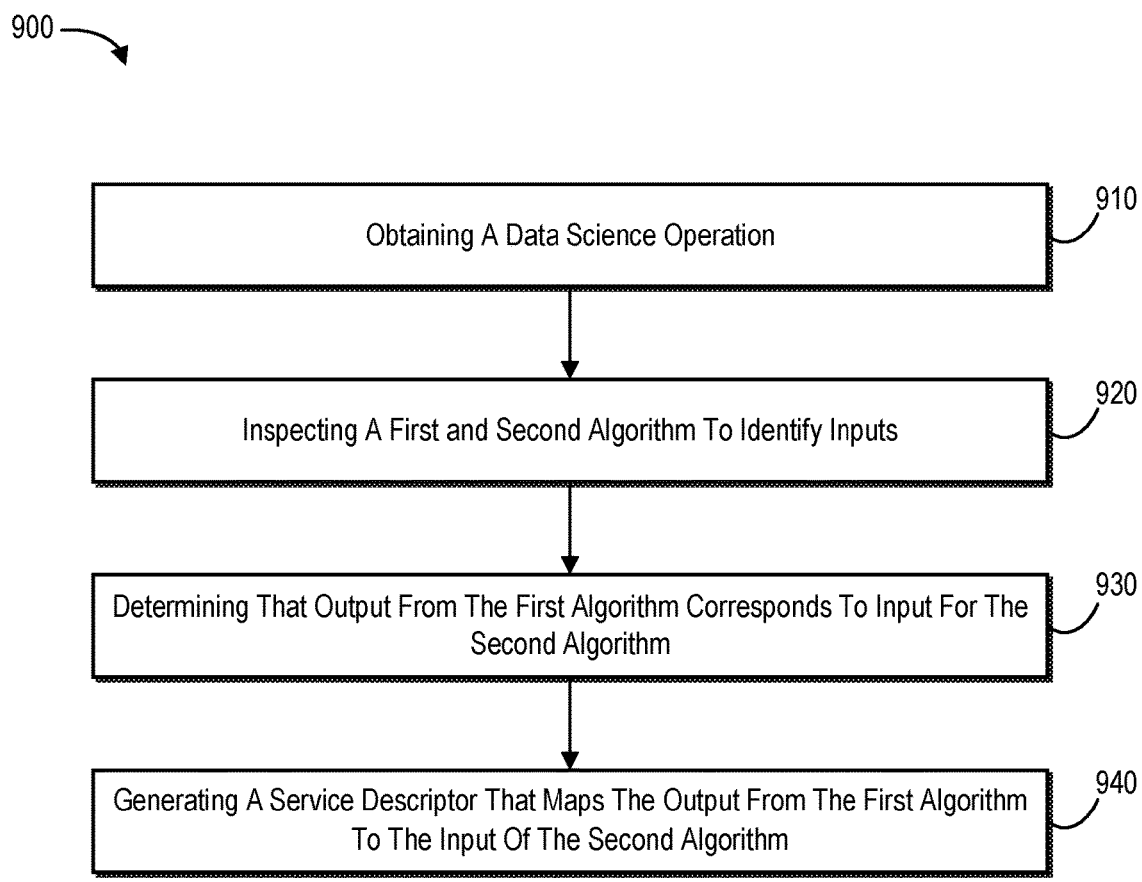
FIG. 9 illustrates another example flow diagram of a method for packaging data science algorithms for network-based deployment in accordance with one or more embodiments.
Figure 10:
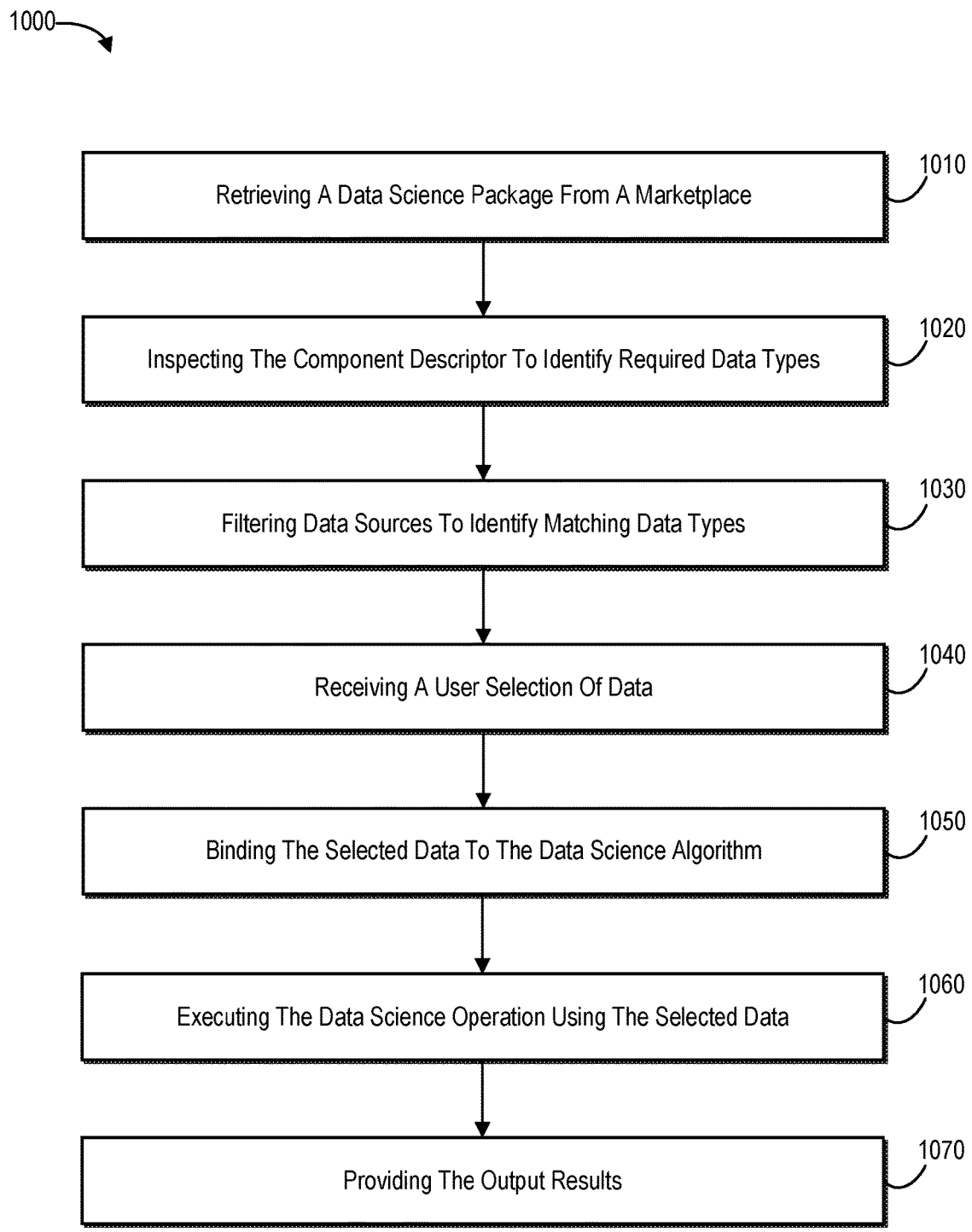
FIG. 10 illustrates an example flow diagram of a method for applying packaged data science algorithms in accordance with one or more embodiments.

FIGS. 1-7, the corresponding text, and the examples provide a number of different systems and devices for performing data science operations in accordance with one or more embodiments. In addition to the foregoing, one or more embodiments can also be described in terms of flowcharts comprising acts and steps in a method for accomplishing a particular result. For example, FIGS. 8-10 illustrate flowcharts of exemplary methods in accordance with one or more embodiments.

Figure 8:
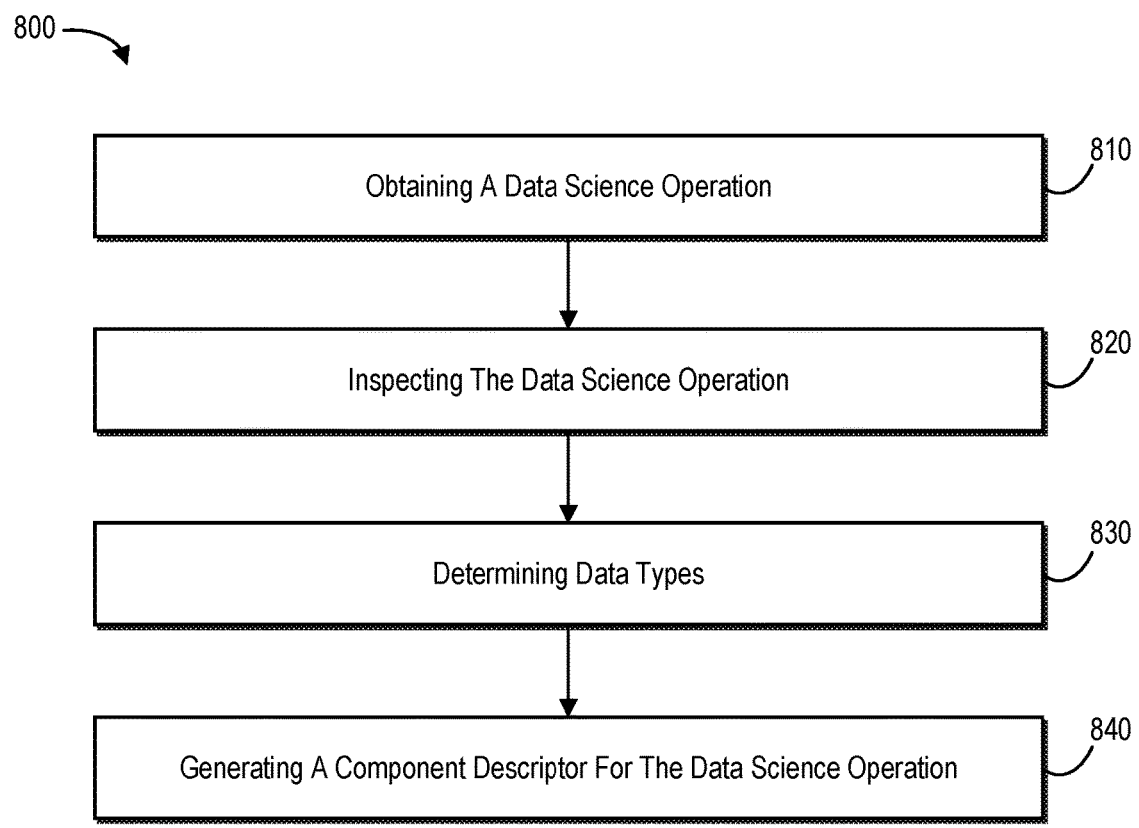
FIG. 8 illustrates an example flow diagram of a method for packaging data science algorithms for network-based deployment in accordance with one or more embodiments.

FIG. 8 illustrates a flowchart of a series of acts in a method 800 for packaging data science algorithms for network-based deployment in accordance with one or more embodiments disclosed herein. In one or more embodiments, the method 800 is implemented in a digital medium environment for performing data science operations. Further, one or more computing devices described herein can implement a data science system that implements the method 800.

The method 800 includes an act 810 of obtaining a data science operation. In particular, act 810 can involve obtaining a data science operation that includes a data science algorithm and referenced data from a data source. In some embodiments, the act 810 involves a receiving a user selection of data from a data source and an action, and generating a data science operation from the user selections. For example, the act 810 includes receiving, from a user within a graphical user interface, a selection of the referenced data from the data source, receiving, from the user within the graphical user interface, a selection of an action that corresponds to the data science algorithm, generating the data science algorithm based on the selected action, and injecting the referenced data from the data source to obtain the data science operation.

As shown in FIG. 8, the method 800 further includes an act 820 of analyzing the data science operation. In particular, the act 820 can involve analyzing the data science operation to identify required parameters and optional parameters of the data science algorithm. In one or more embodiments, the one or more of the required parameters and optional parameters are tunable parameters. A tunable parameter is a parameter that is interchangeable with data from the other data source or a parameter that is modifiable through user input.

The method 800 also includes an act 830 of determining data types. In particular, the act 830 can involve determining, based on the referenced data from the data source, one or more data types required for the data science algorithm. The act 830 can also involve analyzing the parameters in the referenced data and the data science operation to identify data types of the parameters.

Additionally, the method 800 includes an act 840 of generating a component descriptor for the data science operation. In particular, the act 840 can involve generating a component descriptor of the data science operation that includes the one or more data types, the required parameters, and the optional parameters, where the component descriptor allows the data science operation to be applied to and executed with data from another data source. The act 840 can include generating a metadata container that comprises a description of the data science operation, the required parameters, and the optional parameters. The metadata container provides a structure that allows the data science algorithm to be executed with the referenced data or other compatible data. Further, in some embodiments, the description of the data science operation includes a name, version, type, language, and description. The description of the data science operation is obtained from one or more annotations within the data science operation.

The method 800 can also include a number of additional acts. For example, the method 800 can involve the acts of grouping or packaging the component descriptor, the data science operation, and the visualization code into a data science package. Method 800 can further involve indexing or registering the data science package in a marketplace of data science operations. Indexing the data science package involves providing a description of the functionality of the data science operation to a user of the marketplace. Further, the method 800 may include the acts of retrieving the data science package from the marketplace of data science operations, accessing additional data from the other data source that matches the one or more data types in the component descriptor, binding the additional data to the data science algorithm based on the component descriptor, receiving input to modify a parameter of the required parameters and optional parameters, executing, the data science operation to obtain output results using the additional data and based on the modified parameter, and providing a visualization of the output results based on the visualization code in the data science package.

FIG. 9 illustrates a flowchart of a series of acts in another method 900 for packaging data science algorithms for network-based deployment in accordance with one or more embodiments disclosed herein. In one or more embodiments, the method 900 is implemented in a digital medium environment for performing data science operations. Further, one or more computing devices described herein can implement a data science system that implements the method 900.

The method 900 includes an act 910 of obtaining a data science operation. In particular, act 910 can involve obtaining a data science operation that includes referenced data from a data source and a plurality of data science algorithms. In some embodiments, the act 910 involves a receiving a user selection of data from a data source and an action, and generating a data science operation from the user selections. In some embodiments, the data science operation includes one or more required parameters and optional parameters including a first required input of a first data science algorithm, an output of the first data science algorithm, and a first required input of a second data science algorithm.

As shown in FIG. 9, the method 900 further includes an act 920 of analyzing a first and second algorithm to identify inputs. In particular, the act 920 can involve analyzing a first data science algorithm from the plurality of data science algorithms to identify a first required input and analyzing a second data science algorithm from the plurality of data science algorithms to identify a second required input. In one or more embodiments, the act 920 can include accessing a component descriptor for the first data science algorithm, analyzing the component descriptor to identify required parameters and optional parameters, and identifying the required input from the required parameters.

The method 900 also includes an act 930 of determining that output from the first algorithm corresponds to input for the second algorithm. In particular, the act 930 can involve analyzing the first data science algorithm and the second data science algorithm to determine that an output from the first data science algorithm corresponds to the second required input for the second data science algorithm. The act 930 can also involve matching the data type of the output of the first data science algorithm to the input of the second data science algorithm.

Additionally, the method 900 includes an act 940 of generating a service descriptor for the data science operation that maps the output from the first algorithm to the required input of the second algorithm. In particular, the act 940 can involve generating a service descriptor for the data science operation that maps the output from the first data science algorithm to the second required input of the second data science algorithm. The service descriptor allows the data science operation to be applied to and executed with data from another data source. In some embodiments, the service descriptor includes metadata having one or more binding declarations that pairs the output from the first data science algorithm to the required input of the second data science algorithm. The binding declarations enable the data science operation to join the first data science algorithm to the second data science algorithm.

The method 900 can also include a number of additional acts. For example, the method 900 can involve an act of packaging the data science operation, the service descriptor, and the visualization code into a data science package. In another example, the method may include an act of registering the data science package in a marketplace of data science operations. Registering the data science package provides a description of the functionality of the data science operation to a user of the marketplace.

In one or more embodiments, the method 900 includes the acts of retrieving the data science package from the marketplace of data science operations, accessing an additional data from the other data source that matches the first required input, binding the additional data to the first required input of the first data science algorithm based on the binding declarations in the service descriptor, and executing the data science operation using the additional data to obtain output results. The method 900 can further include an act of employing the visualization code included in the data science package to display the output results in a graphical user interface. The visualization code provides a chart, graph, plot, or scatter of the output results.

FIG. 10 illustrates a flowchart of a series of acts in a method 1000 for applying packaged data science algorithms. In one or more embodiments, the method 1000 is implemented in a digital medium environment for performing data science operations. Further, one or more computing devices described herein can implement a data science system that implements the method 1000.

The method 1000 includes an act 1010 of retrieving a data science package from a marketplace. In particular, the act 1010 can involve retrieving a data science package from a marketplace of data science operations. The data science package comprises a component descriptor, a data science operation having a data science algorithm, and the visualization code. For example, the act 1010 includes the user purchasing the data science package from the marketplace.

The method 1000 further includes an act 1020 of analyzing the component descriptor to identify required data types. In particular, the act 1020 can involve analyzing the component descriptor to identify one or more data types required for the data science algorithm. In some embodiments, the act 1020 involves identifying, from the component descriptor, required parameters and optional parameters of the data science algorithm.

The method 1000 also includes an act 1030 of filtering data sources to identify matching data types. In particular, the act 1030 may include filtering a plurality of data sources corresponding to a user to identify one or more data sources that include the one or more data types in the component descriptor. In various embodiments, the act 1030 includes determining that the one or more data types in the component descriptor match data located in the one or more data sources.

In addition, the method 1000 includes an act 1040 of receiving a user selection of data. In particular, the act 1040 may involve receiving a user selection of data from a filtered data source of the plurality of filtered data sources. In one or more embodiments, the act 1040 includes providing a graphical user interface listing the filtered data sources, and receiving a selection of the filtered data source from within the list of filtered data sources.

The method 1000 further includes an act 1050 of binding the selected data to the data science algorithm. In particular, the act 1050 may involve binding the data to the data science algorithm using binding information included in the component descriptor. In some embodiments, the act 1050 includes injecting the data into the data science algorithm as part of the binding process.

The method further includes the act 1060 of executing the data science operation using the selected data. In particular, the act 1060 can involve executing, using the data, the data science operation to obtain output results. For example, the act 1060 runs the data science operation in any suitable manner as described herein. In some embodiments, the act 1060 also includes prompting the user to modify one or more parameters of the required parameters or optional parameters, and executing the data science operation includes executing the data science operation based on the modified parameters.

The method 1000 also includes an act 1070 of providing the output results. In particular, the act 1070 may include providing, to the user in a graphical user interface, a visualization of the output results. In various embodiments, the act 1070 of providing the visualization of the output results includes generating a graphic visualization using the visualization code in the data science package.

Embodiments of the present disclosure may comprise or utilize a special purpose or general-purpose computer including computer hardware, such as, for example, one or more processors and system memory, as discussed in additional detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media accessible by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives, Flash memory, phase-change memory, other types of memory, other optical disk storage, magnetic disk storage or other magnetic storage devices, or any other medium that is used to store desired program code means in the form of computer-executable instructions or data structures, and that is accessible by a general purpose or special purpose computer.

The term "digital environment," as used herein, generally refers to an environment that is implemented, for example, as a stand-alone application (e.g., a personal computer or mobile application running on a computing device), as a module of an application, as a plug-in for an application, as a library function or functions that may be called by a network application creation system, and/or as a cloud-computing system. A digital medium environment allows users to create, test, and/or edit data science operations in connection with a data science system.

Computer-executable instructions comprise, for example, instructions and data which, when executed by a processor, cause a general purpose computer, special-purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methods, it is to be understood that the subject matter defined in the appended claims is not necessarily limited to the described features or acts described above. Rather, the described features and acts are disclosed as example forms of implementing the claims.

Figure 11:
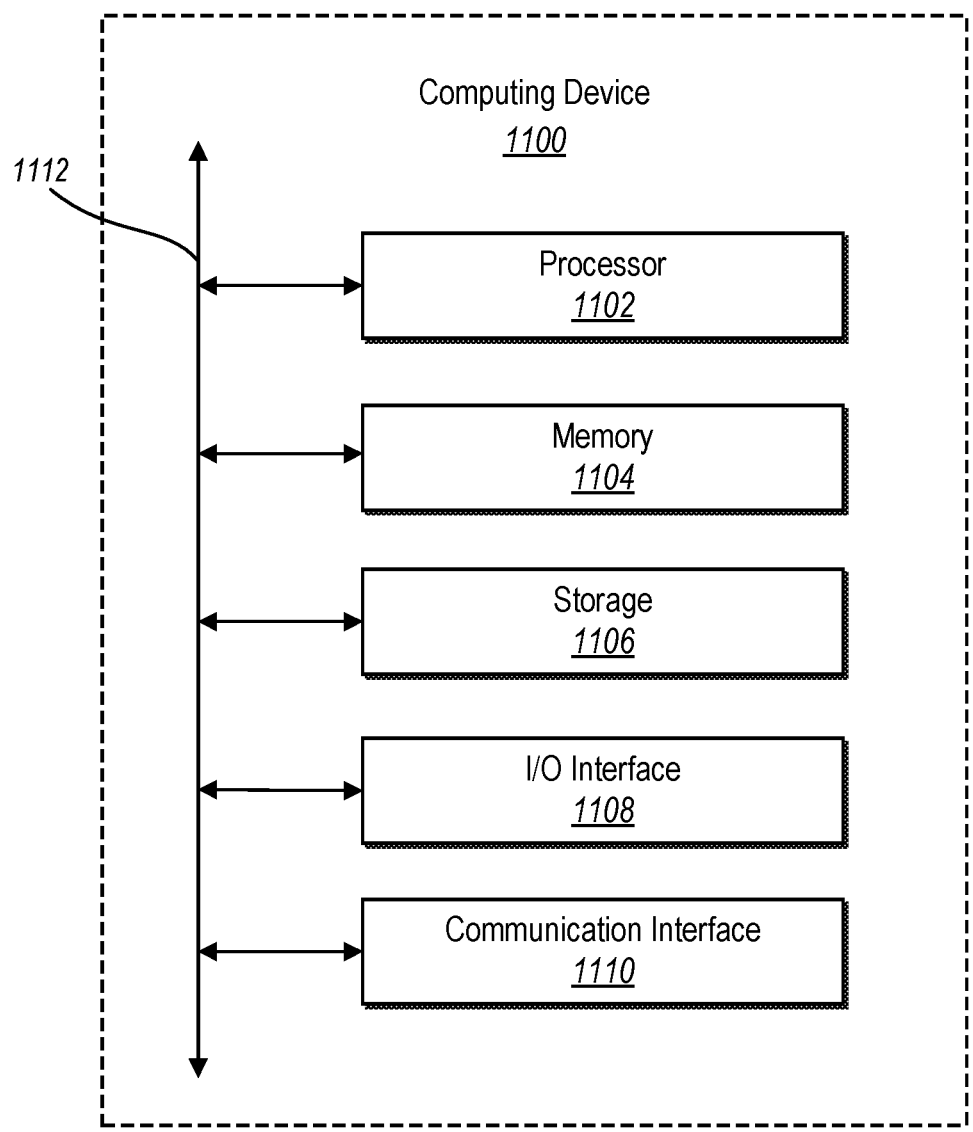
FIG. 11 illustrates a block diagram of an exemplary computing device in accordance with one or more embodiments.

FIG. 11 illustrates a block diagram of an exemplary computing device 1100 that may be configured to perform one or more of the processes described above. One will appreciate that one or more computing devices, such as the computing device 1100 may host the data science system 102, 700. Alternatively, the computing device 1100 may include a device (e.g., client device 104) that communicates with the data science system 102, 700 and/or marketplace 110. In one or more embodiments, the computing device 1100 may be a mobile device (e.g., a mobile telephone, a smartphone, a PDA, a tablet, a laptop, a camera, a tracker, a watch, a wearable device, etc.). In some embodiments, the computing device 1100 may be a non-mobile device (e.g., a desktop computer or another type of client device).

As shown in FIG. 11, the computing device 1100 can comprise one or more processor(s) 1102, memory 1104, a storage device 1106, an input/output ("I/O") interface 1108, and a communication interface 1110, which may be communicatively coupled by way of a communication infrastructure (e.g., bus 1112). While an exemplary computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example and not by way of limitation, storage device 1106 can comprise a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

I claim:

1. In a digital environment for performing data science operations, a method of packaging data science algorithms for network-based deployment, the method comprising:

obtaining, by at least one processor, a data science operation comprising a data science algorithm and referenced data from a data source;

analyzing the data science operation to identify required parameters and optional parameters of the data science algorithm;

determining, based on the referenced data from the data source, a data type required for the data science algorithm; and generating a component descriptor for the data science operation comprising the data type, the required parameters, and the optional parameters, wherein the component descriptor allows the data science operation to be applied to and executed with compatible data from another data source by replacing the referenced data in the data science operation.

2. The method as recited in claim 1, wherein a parameter of the required parameters and optional parameters is a tunable parameter, and wherein a tunable parameter is a parameter that is interchangeable with data from the another data source or a parameter that is modifiable through user input.

3. The method as recited in claim 1, wherein generating the component descriptor comprises generating a metadata container that comprises a description of the data science operation, the required parameters, and the optional parameters, wherein the metadata container provides a structure that allows the data science algorithm to be executed with the referenced data or other compatible data.

4. The method as recited in claim 3, further comprising grouping the component descriptor, the data science operation, and visualization code into a data science package.

5. The method as recited in claim 4, further comprising indexing the data science package within a marketplace of data science operations, wherein indexing the data science package provides a description of the functionality of the data science operation to a user of the marketplace.

6. The method as recited in claim 5, further comprising:
retrieving the data science package from the marketplace of data science operations;
accessing additional data from the another data source that matches a data type in the component descriptor;
binding the additional data to the data science algorithm based on the component descriptor;
receiving input to modify a parameter of the required parameters and optional parameters;
executing, using the additional data and based on the modified parameter, the data science operation to obtain output results; and
providing a visualization of the output results based on the visualization code in the data science package.

7. The method as recited in claim 3, wherein the description of the data science operation comprises a name, version, type, language, and description, and wherein the description of the data science operation is obtained from annotations within the data science operation.

8. The method as recited in claim 1, wherein obtaining the data science operation comprises:
receiving, from a client device associated with a user within a graphical user interface, a selection of the referenced data from the data source;
receiving, from the client device associated with the user within the graphical user interface, a selection of an action that corresponds to the data science algorithm;
generating the data science algorithm based on the selected action; and injecting the referenced data from the data source to obtain the data science operation.

9. In a digital environment for performing data science operations, a system of packaging data science algorithms for network-based deployment, the system comprising:
at least one processor;
at least one non-transitory computer readable storage medium storing instructions thereon that, when executed by the at least one processor, cause the system to:
obtain a data science operation comprising referenced data from a data source, a first data science algorithm, and a second data science algorithm;
analyze the first data science algorithm to identify a first required input;
analyze the second data science algorithm to identify a second required input;
analyze the first data science algorithm and the second data science algorithm to determine that an output from the first data science algorithm corresponds to the second required input for the second data science algorithm; and
generate a service descriptor for the data science operation that maps the output from the first data science algorithm to the second required input of the second data science algorithm, wherein the service descriptor allows the data science operation to be applied to and executed with compatible data from another data source.

10. The system as recited in claim 9, further comprising instructions that, when executed by the at least one processor, cause the system to:
analyze the first data science algorithm and the referenced data to determine a data type and a first set of requirements for the first required input;
analyze the second data science algorithm to determine a data type and a second set of requirements for the second required input; and
wherein the service descriptor for the data science operation further defines the data type and the first set of requirements for the first required input for the first data science algorithm and the data type for the second required input for the second data science algorithm.

11. The system as recited in claim 9, wherein the instructions cause the system to analyze the first data science algorithm to identify a first required input by:
accessing a component descriptor for the first data science algorithm;
analyzing the component descriptor to identify required parameters and optional parameters; and
identifying the required input from the required parameters.

12. The system as recited in claim 9, wherein the data science operation comprises a set of required parameters and optional parameters, and wherein the set of required parameters comprise the first required input of the first data science algorithm, the output of the first data science algorithm, the first required input of the second data science algorithm, and an output of the second data science algorithm.

13. The system as recited in claim 9, wherein the service descriptor comprises metadata that includes a least one binding declaration that pairs the output from the first data science algorithm to the required input of the second data science algorithm, and wherein the binding declarations enable the data science operation to join the first data science algorithm to the second data science algorithm.

14. The system as recited in claim 13, further comprising instructions that, when executed by the at least one processor, cause the system to:
group the data science operation, the service descriptor, and visualization code into a data science package; and
index the data science package within a marketplace of data science operations, wherein an indexed data science package provides a description of the functionality of the data science operation to a user of the marketplace.

15. The system as recited in claim 14, further comprising instructions that, when executed by the at least one processor, cause the system to:
retrieve the data science package from the marketplace of data science operations;
access additional data from the another data source that matches the first required input;
bind the additional data to the first required input of the first data science algorithm based on the binding declarations in the service descriptor; and
execute the data science operation using the additional data to obtain output results.

16. The system as recited in claim 15, comprising instructions that, when executed by the at least one processor, cause the system to employ the visualization code included in the data science package to display the output results in a graphical user interface, wherein the visualization code provides a chart, graph, plot, or scatter of the output results.

17. A non-transitory computer-readable medium storing instructions that, when executed by at least one processor, cause a computer system to:
retrieve a data science package from a marketplace of data science operations, wherein the data science package comprises a component descriptor, a data science operation having a data science algorithm, and visualization code;
analyze, by at least one processor, the component descriptor to identify a data type required for the data science algorithm;
filter a plurality of data sources corresponding to a user to identify a compatible data source that includes the data type in the component descriptor;
receive from a client device associated with a user selection of compatible data from a filtered data source of the plurality of filtered data sources;
bind the selected compatible data to the data science algorithm using binding information included in the component descriptor;
execute, using the selected compatible data, the data science operation to obtain output results; and
provide, to the client device associated with the user in a graphical user interface, a visualization of the output results.

18. The non-transitory computer-readable medium as recited in claim 17, further comprising instructions that, when executed by at least one processor, cause the computer system to identify, from the component descriptor, required parameters and optional parameters of the data science algorithm.

19. The non-transitory computer-readable medium as recited in claim 18, further comprising instructions that, when executed by at least one processor, cause the computer system to prompt the client device associated with the user to modify at least one parameter of the required parameters or optional parameters, and wherein executing the data science operation is based on the modified at least on parameter.

20. The non-transitory computer-readable medium as recited in claim 17, wherein providing the visualization of the output results comprises generating a graphic visualization using the visualization code in the data science package.

* * * * *